(12) United States Patent
Assénat et al.

(10) Patent No.: US 12,291,296 B2
(45) Date of Patent: May 6, 2025

(54) CYCLE MANAGEMENT SYSTEM WITH LOCKING MECHANISM

(71) Applicant: Lyft, Inc., San Francisco, CA (US)

(72) Inventors: Raphaël Assénat, Quebec (CA); Jean-Sébastien Bettez, Hudson (CA)

(73) Assignee: Lyft, Inc., San Francisco, CA (US)

( * ) Notice: Subject to any disclaimer, the term of this patent is extended or adjusted under 35 U.S.C. 154(b) by 0 days.

(21) Appl. No.: 18/405,993

(22) Filed: Jan. 5, 2024

(65) Prior Publication Data

US 2024/0217605 A1 Jul. 4, 2024

Related U.S. Application Data

(63) Continuation of application No. 16/918,991, filed on Jul. 1, 2020, now Pat. No. 11,866,109, which is a continuation of application No. 15/230,195, filed on Aug. 5, 2016, now Pat. No. 10,723,399.

(60) Provisional application No. 62/201,544, filed on Aug. 5, 2015.

(51) Int. Cl.
  *B62H 3/00* (2006.01)
(52) U.S. Cl.
  CPC ......... *B62H 3/00* (2013.01); *B62H 2003/005* (2013.01)
(58) Field of Classification Search
  CPC .. E05B 71/00; Y10T 70/5872; Y10T 70/5889; Y10T 70/7102; Y10T 70/7107; Y10T 292/1082; Y10T 292/1047; Y10S 292/23

USPC .... 70/233, 237, 278.7, 279.1; 292/201, 216, 292/DIG. 23
See application file for complete search history.

(56) References Cited

U.S. PATENT DOCUMENTS

| | | | |
|---|---|---|---|
| 4,830,167 A | 5/1989 | Lassche | |
| 5,917,407 A | 6/1999 | Squire | |
| 10,723,399 B2 * | 7/2020 | Assenat | ........... B62H 3/00 |
| 11,866,109 B2 * | 1/2024 | Assenat | ........... B62H 3/00 |
| 2011/0148346 A1 | 6/2011 | Gagosz | |
| 2013/0019642 A1 | 1/2013 | Karcz | |

FOREIGN PATENT DOCUMENTS

| | | |
|---|---|---|
| CN | 203499355 U | 3/2014 |
| EP | 2639143 A1 | 9/2013 |
| GB | 2455551 A | 6/2009 |

(Continued)

*Primary Examiner* — Suzanne L Barrett
(74) *Attorney, Agent, or Firm* — Baker Botts L.L.P.

(57) ABSTRACT

An object management system and locking mechanism and method, such as may be used in a bicycle rental station. The system comprises a plurality of docking stations and a terminal connected to the docking stations by a network. At least one of the docking stations includes the locking mechanism for locking a connecting member secured to a bicycle or other object. The locking mechanism comprises a locking receptacle configured to receive the connecting member; a movable member positioned in the locking receptacle, the movable member having a lockable position and an unlockable position; and a locking member having a locked position and an unlocked position. The locking member is configured to secure the movable member, the movable member is configured to secure the connecting member, and the locking member is configured to rotate to switch between the locked position and unlocked position.

20 Claims, 39 Drawing Sheets

(56) References Cited

FOREIGN PATENT DOCUMENTS

| KR | 100853704 B1 | 8/2008 |
|----|--------------|--------|
| KR | 20110048601 A | 5/2011 |

* cited by examiner

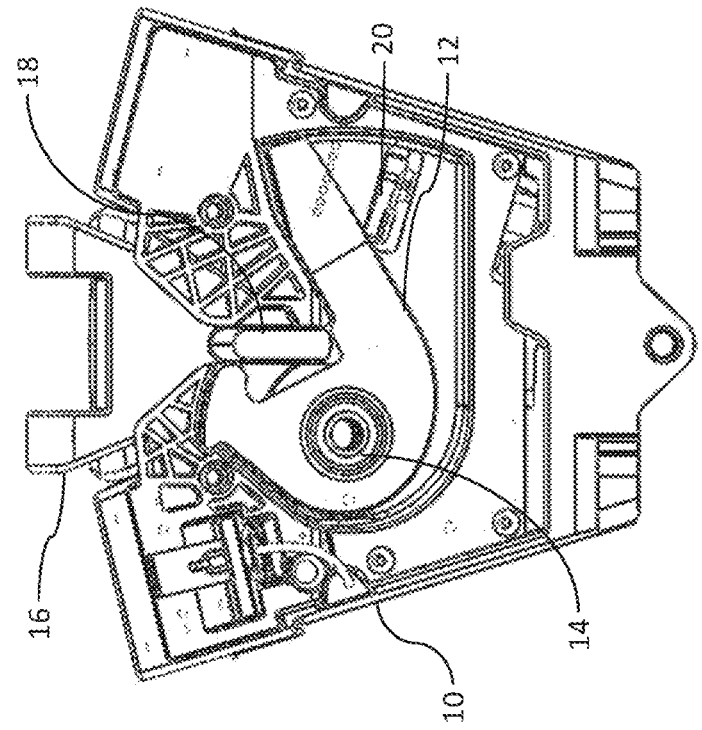
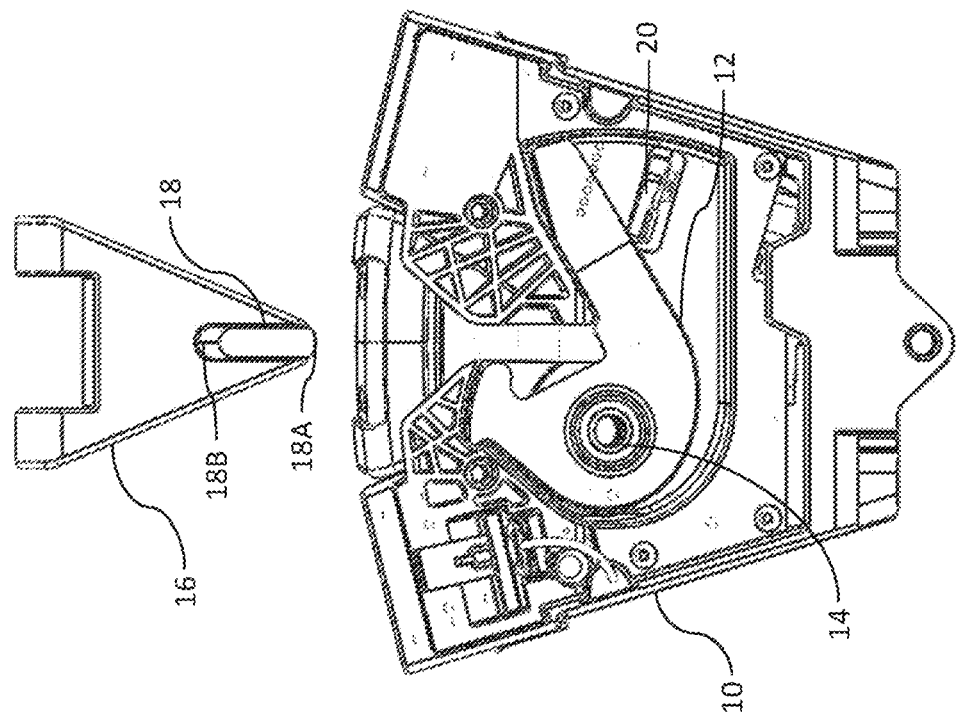
FIG. 3A
FIG. 3B

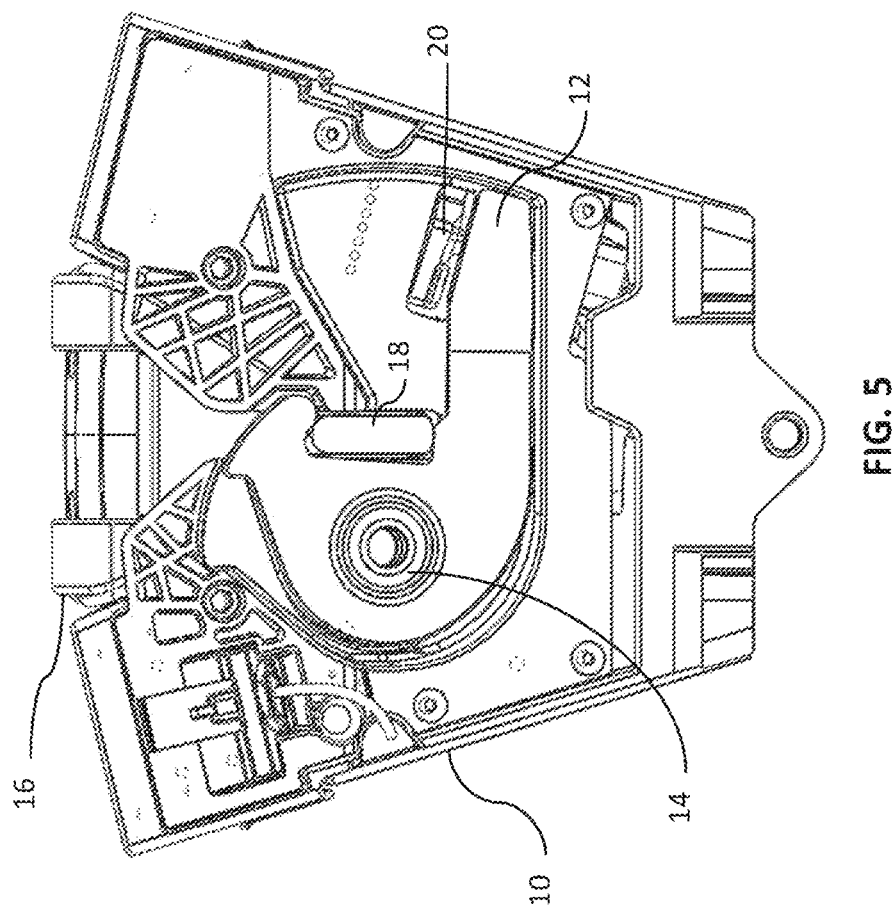

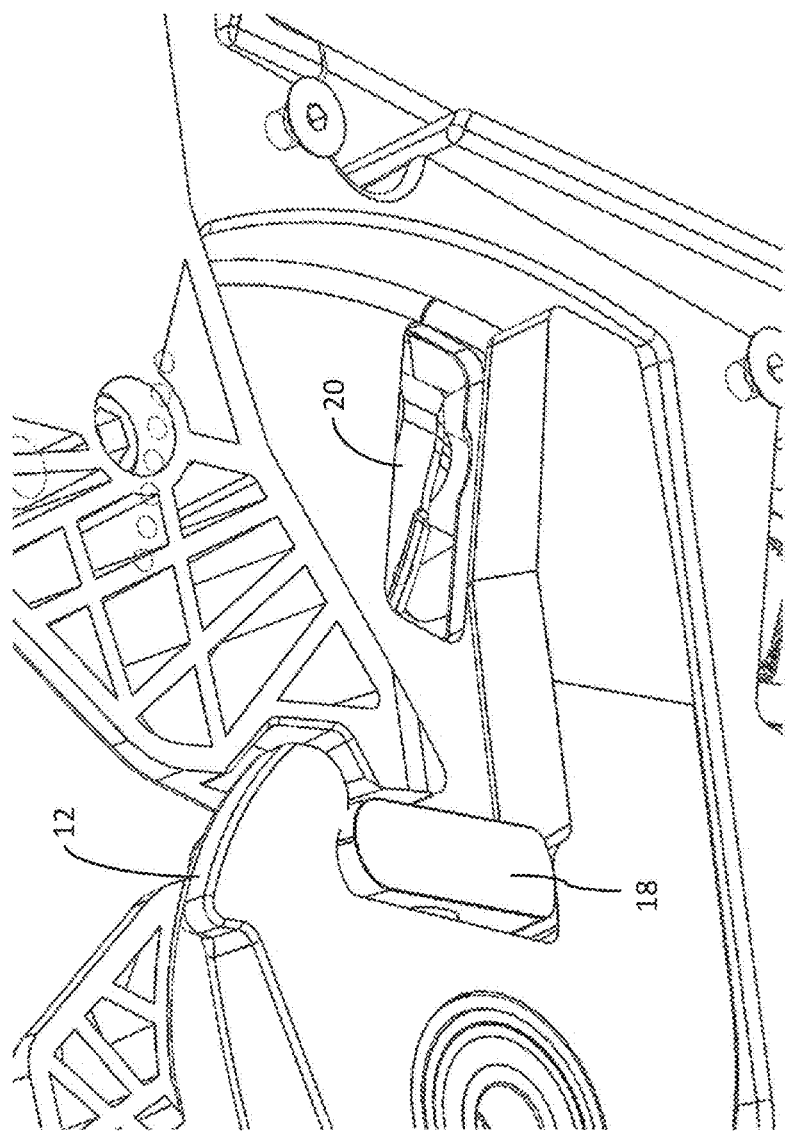

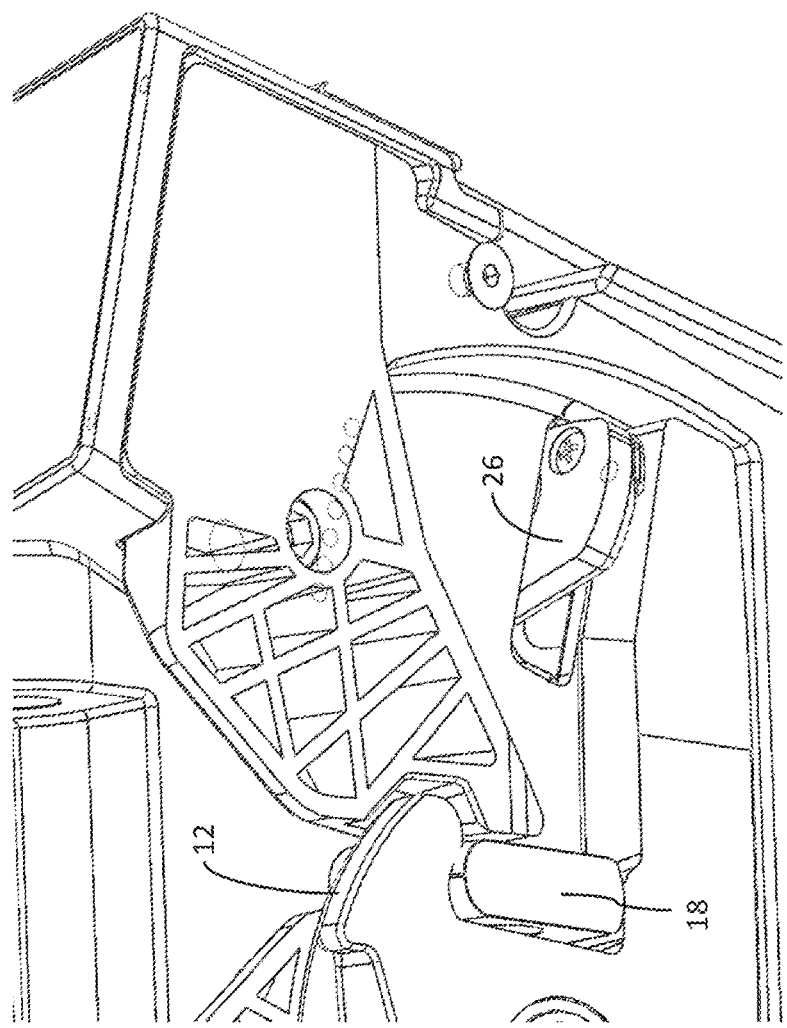

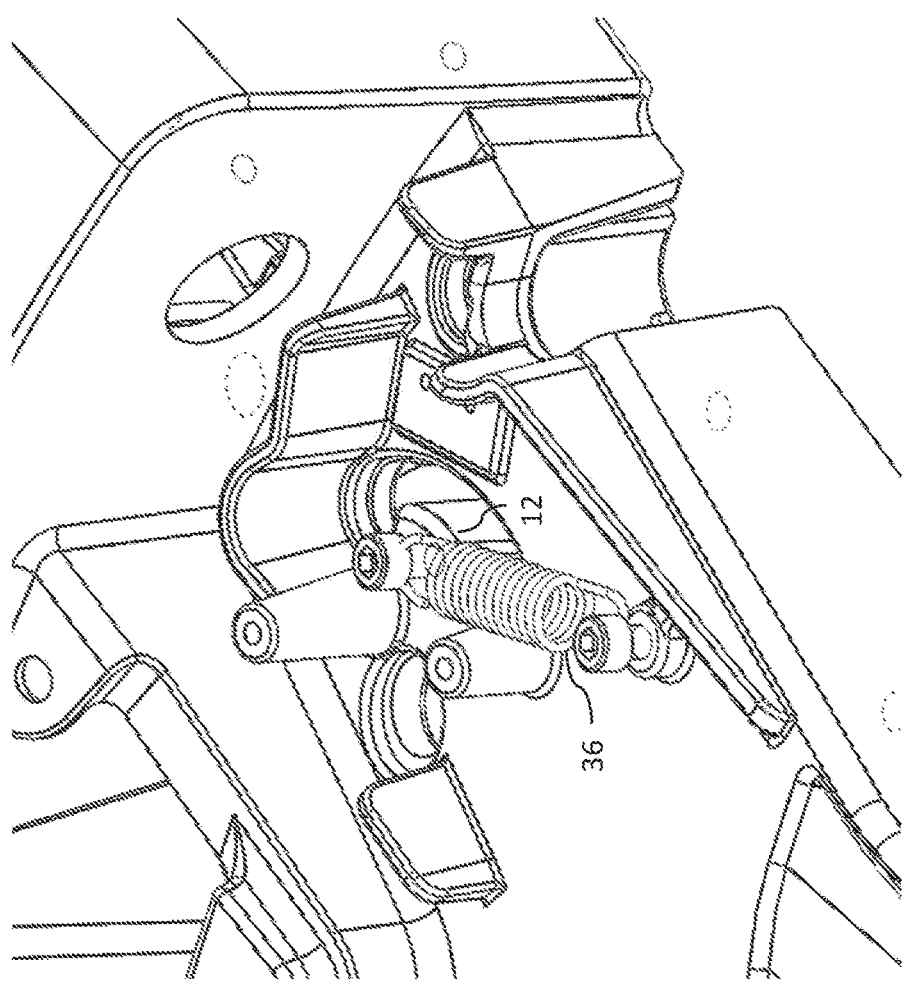

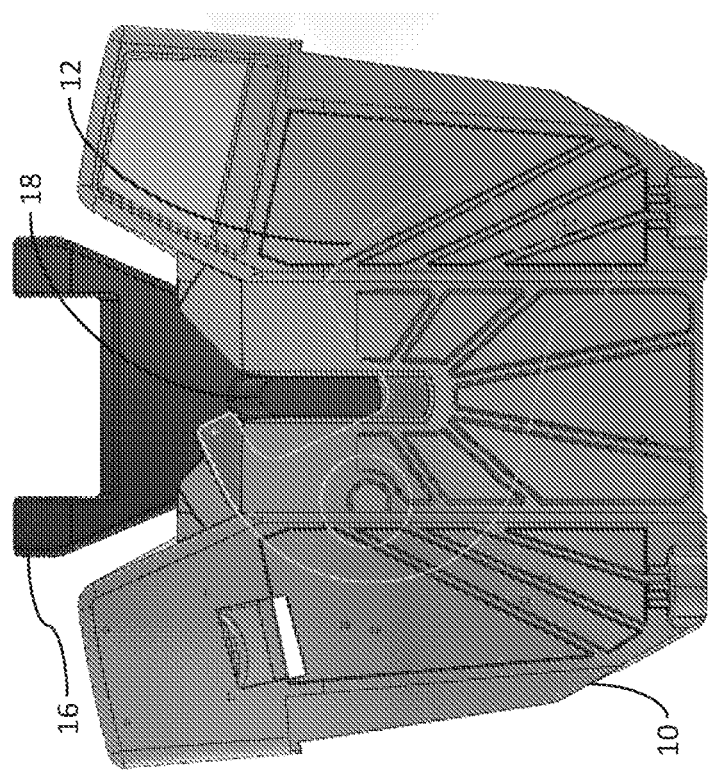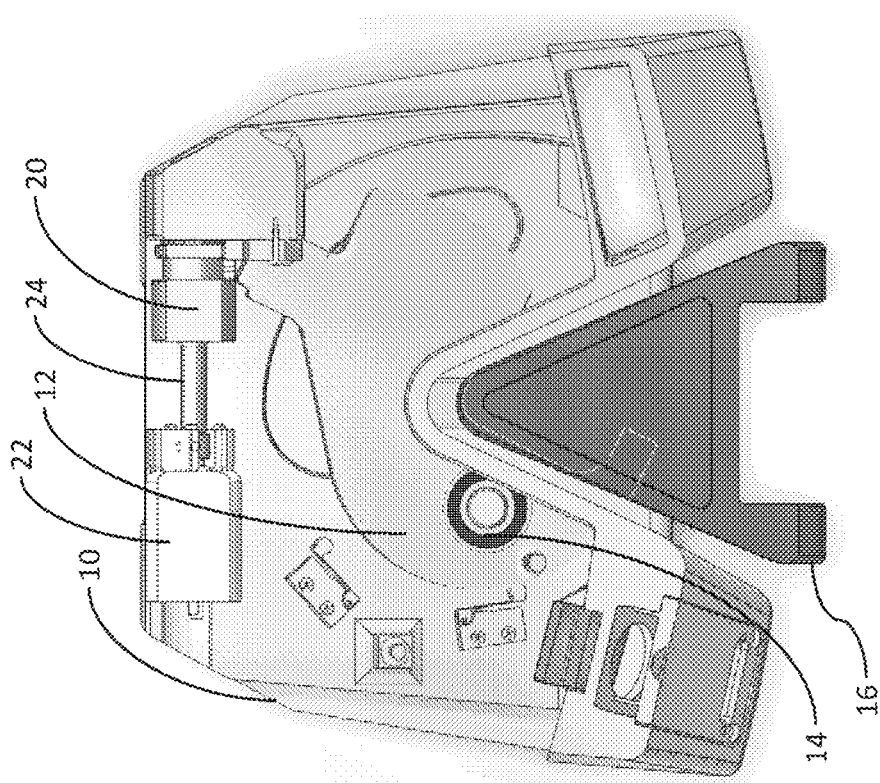
FIG. 20A
FIG. 20B

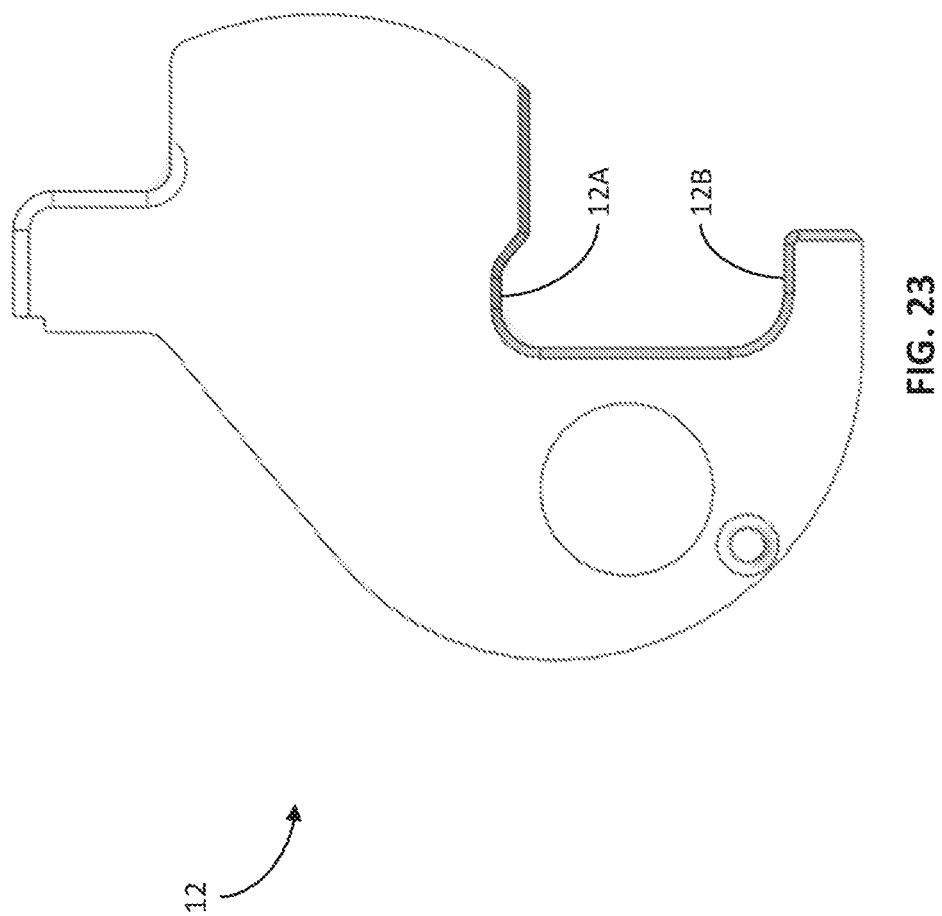

CYCLE MANAGEMENT SYSTEM WITH LOCKING MECHANISM

CROSS-REFERENCE TO RELATED APPLICATIONS

This application is a continuation under 35 U.S.C. § 120 of U.S. patent application Ser. No. 16/918,991, filed 1 Jul. 2020 and issued as U.S. Pat. No. 11,866,109 on 9 Jan. 2024, which is a continuation under 35 U.S.C. § 120 of U.S. patent application Ser. No. 15/230,195, filed 5 Aug. 2016, now issued as U.S. Pat. No. 10,723,399 on 28 Jul. 2020, which claims the benefit under 35 U.S.C. § 119(e) of U.S. Provisional Patent Application No. 62/201,544, filed 5 Aug. 2015, all of which are incorporated herein by reference.

BACKGROUND

Bicycle rental systems include several rental/docking stations located in different parts of a city that allow a user to rent, pick up, and return a cycle. To prevent theft, the docking stations include a locking mechanism to lock the cycle to a dock, post, or other fixed structure between rental periods. When a user wishes to rent a cycle from a docking station, the user is required to provide some form of payment or identification to validate the rental and unlock the cycle. When the rental is complete, the user returns the cycle to the docking station where the cycle is again locked via the locking mechanism.

SUMMARY

Some aspects include a locking mechanism for locking a connecting member secured to a cycle or other object. The locking mechanism may comprise a locking receptacle configured to receive the connecting member; a movable member positioned in the locking receptacle, the movable member having a lockable position and an unlockable position; and a locking member having a locked position and an unlocked position. The locking member may be configured to secure the movable member when the movable member is in the lockable position and the locking member is in the locked position. The movable member may be configured to secure the connecting member when the movable member is in the lockable position while the connecting member is disposed within the locking receptacle. The locking member may be configured to move to switch between the locked position and the unlocked position.

Further aspects include a method for operating a locking mechanism on a structure to lock an object to the structure. The method may comprise receiving a connecting member attached to the object in a locking receptacle of the locking mechanism, the connecting member comprising a projection having a first edge and a second edge, opposite the first edge of the projection; rotating a movable member from a first position to a second position due to force applied by the first edge of the projection against a first edge of the movable member, wherein the movable member comprises a second edge opposite the first edge of the movable member, and rotation of the movable member positions the second edge of the movable member adjacent the second edge of the projection when the movable member is in the second position; and displacing an additional member into a position adjacent the movable member at which the additional member blocks rotation of the movable member from the second position toward the first position.

Additional aspects include an object management system. The object management system may comprise a plurality of docking stations and a terminal connected to the plurality of docking stations by a network. At least one of the plurality of docking stations may include a key reader configured to read a key and a locking mechanism for locking a connecting member secured to an object. The locking mechanism may include a locking receptacle configured to receive the connecting member; a movable member positioned in the locking receptacle, the movable member having a lockable position and an unlockable position; and a locking member having a locked position and an unlocked position. The locking member may be configured to secure the movable member when the movable member is in the lockable position and the locking member is in the locked position. The movable member may be configured to secure the connecting member when the movable member is in the lockable position while the connecting member is disposed within the locking receptacle. The locking member may be configured to move to switch between the locked position and the unlocked position.

BRIEF DESCRIPTION OF THE DRAWINGS

The accompanying drawings are not necessarily intended to be drawn to scale. In the drawings, each identical or nearly identical component that is illustrated in various figures is represented by a like numeral. For purposes of clarity, not every component may be labeled in every drawing. In the drawings:

FIGS. 3A and 3B are bottom views of the locking receptacle and connecting member of FIGS. 2A and 2B with the connecting member advanced toward a dockable position and in a contacting position, respectively, according to some embodiments;

FIG. 5 is a bottom view of the locking receptacle and connecting member of FIGS. 2A and 2B with the connecting member advanced to the dockable position according to some embodiments;

FIGS. 9A and 9B are bottom perspective views of a portion of the locking receptacle and the locking member of FIGS. 8A and 8B with the locking member in an unlocked positions and a locked position, respectively, according to some embodiments;

FIGS. 15A, 15B, and 15C are perspective views of a bias spring and the movable member according to some embodiments;

FIGS. 20A and 20B are top and bottom, respectively, views of the locking receptacle and connecting member of FIGS. 19A and 19B with the connecting member advanced toward a dockable position according to alternative embodiments;

FIG. 23 is a top plan view of the movable member of FIGS. 19A and 19B according to alternative embodiments.

DETAILED DESCRIPTION

Figure 1:
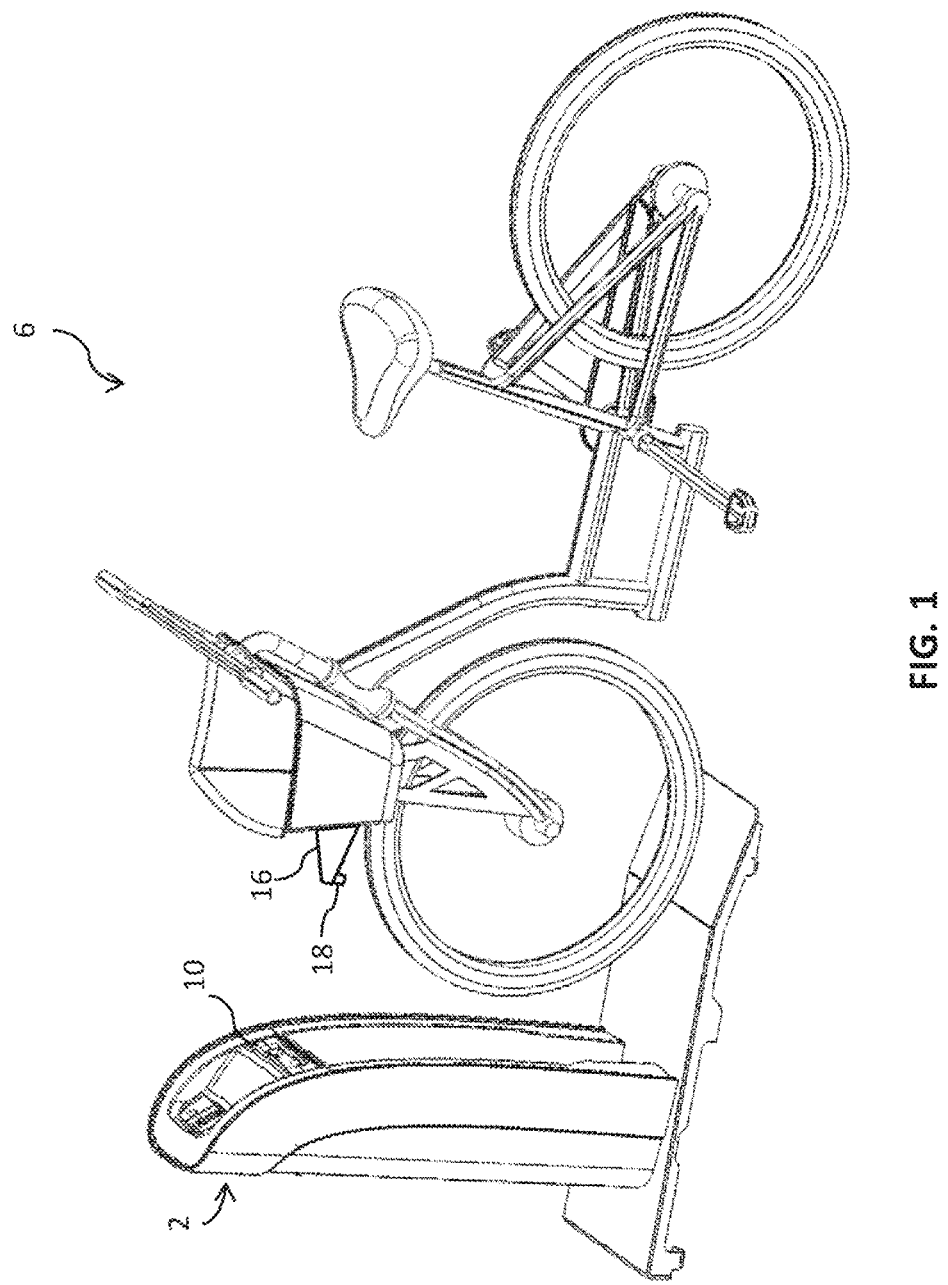
FIG. 1 is a perspective view of a cycle and a docking station according to an embodiment.

The inventors have recognized and appreciated that a problem with current locking mechanisms used in cycle rental systems and systems that similarly secure objects is that they are not sufficiently strong or theft-proof. Locking mechanisms that rely on a shaft entering an aperture may break, malfunction, or be manipulated to unlock without permission. Such aperture-based locking mechanisms also require a substantial alignment between the aperture and the path of the shaft when the shaft is actuated. If the aperture and shaft are not substantially aligned, the shaft will not enter the aperture, resulting in a failure to lock, damage to the locking mechanism, and/or a malfunction of the locking mechanism. Ensuring such a good alignment can be a manufacturing challenge as well as a challenge to a user.

The good alignment required between the shaft and aperture must also be maintained while the shaft is in motion—otherwise friction may prevent the movement from completing, resulting in failure to return or remove an object. To alleviate such alignment problems, lateral ball plungers have been used. These ball plungers, positioned within the locking mechanism, engage recesses in a connecting member on the cycle when the connecting member is pushed into position for locking. These ball plungers increase complexity and cost while leading to other problems. For example, when a cycle is locked in the locking mechanism and the ball plungers are held in a compressed position, the ball plungers are susceptible to water ingress. Water accumulates behind the balls and, if the water freezes, the ball plungers will be jammed, potentially preventing removal of the cycle. Another undesirable side effect of the ball plungers is that they increase the force required to insert a cycle into the locking mechanism or remove a cycle, which a user must apply to work against the ball plungers.

The inventors have recognized and appreciated that another issue with current locking mechanisms is ensuring that the cycle is properly locked when the user returns it to the docking station. When a user returns a cycle, the lock may malfunction, but some users may reasonably believe that the cycle is properly locked and leave the cycle unsecured. For example, the ball plungers may engage with the connecting member to mislead a user into believing a cycle is fully returned and secured when it is not. Such misleading can occur because the ball plungers hold the cycle in place to maintain alignment, which may suggest to the user that the cycle is fully returned and secured. Even if there are visible and audible cues when the system locks successfully, such as a green light and a sound, an inattentive user might not notice their absence due to lighting conditions, ambient city street noise, or other distractions and may continue believing incorrectly that the cycle is fully returned and secured.

The inventors have recognized and appreciated that prior aperture-based locking mechanisms may also be easily damaged. For instance, if a user tries to pull a cycle out of the locking mechanism while the shaft has only traveled half of the distance through the aperture, the shaft may bend and prevent the locking mechanism from working properly until this bent shaft is replaced. Even if the shaft were larger and more resistant to bending, a more powerful motor (using more energy) and a bigger aperture (requiring a heavier connecting member on the cycle) may be required.

These problems can be particularly severe for cycle rental systems that are generally deployed in unattended locations over large geographic areas, such as throughout a city. As a further issue, some such cycle rental stations are solar powered, such that making a locking mechanism with heavier components for secure locking may draw more power than can be supplied with a solar powered system. Moreover, these systems are usually outside, where they are exposed to the elements or can be accessed at night by people seeking to steal cycles. Further, such systems are often operated by people wanting to rent cycles with no special training in the operation of the system.

The inventors have recognized and appreciated that a locking mechanism may have improved strength, theft-proofing, simplicity, reliability, energy efficiency, and compatibility by not relying on an aperture receiving a shaft to lock an object. Instead, such an improved locking mechanism may, according to some embodiments, rely upon a movable member that displaces (e.g., rotates) to capture (e.g., encircle) a connecting member when the connecting member is placed into the locking receptacle of the locking mechanism. Such an improved locking mechanism may have improved strength because, according to some embodiments, it may use a movable member that is larger and/or more massive, and thus more resistant to bending, than the shaft of an aperture-based locking mechanism or similar components of prior locking mechanisms (for example, see the movable member 12 according to some embodiments in FIGS. 2A-5, 9A, 9B, and 11A-16B). The improved strength of the movable member may help to make the locking mechanism more theft-proof, in addition to other ways described herein.

Such an improved locking mechanism may have improved simplicity—and reduced cost in manufacturing and maintenance—because it may not require or use ball plungers and may not rely on an aperture that receives a shaft for locking. Rather, the improved locking mechanism, according to some embodiments, may rely on simple force applied by the user to displace the movable member closer to a lockable position from an unlockable position. The displacement of the movable member may cause the movable member to capture (e.g., encircle) the connecting member, thereby drawing the connecting member into the lockable position, despite some initial misalignment of the movable member and the connecting member. The improved locking mechanism's simplicity and flexibility regarding misalignment may help to make the locking mechanism more reliable. For example, according to some embodiments, at least a portion of the movable member may be C-shaped to allow the movable member to encircle the connecting member.

The inventors have recognized and appreciated that the improved locking mechanism may also be more reliable in that it may enable motion of a cycle being docked at the station that better communicates to a user that a cycle is not fully secured than previous locking mechanisms. For example, the improved locking mechanism may allow a cycle to move freely when the cycle is not fully secured, which would not likely give the user reason to believe the cycle is fully secured. In the event of a power outage or electronic defect, the improved locking mechanism could still allow a cycle to move freely, which may clearly indicate to the user that the cycle has not been fully secured.

The inventors have recognized and appreciated that the improved locking mechanism may be more energy efficient than previous locking mechanisms. For example, according to some embodiments, using the user's force to displace the movable member over some or all of the path between an unlockable and lockable position may allow the movable member to be more massive but not require a more powerful motor. The inventors have recognized and appreciated that using the user's force to move the movable member may result in significant energy savings because reduced or no mechanical driving may be needed to place the movable member in the lockable position. This may be particularly advantageous where the only power source is solar and/or a battery charged from solar power.

The inventors have recognized and appreciated that the improved locking mechanism may provide any of the advantages described above and more while still being compatible with previous locking mechanisms. For example, according to some embodiments, the improved locking mechanism may support a connecting member that includes an aperture, but the improved locking mechanism may not rely on the aperture in any way to secure the connecting member.

Such an improved locking mechanism would be beneficial to use in cycle management systems to lock a cycle to a docking station between rentals. The connecting member may be secured to a bicycle or other cycle and positioned such that it may be inserted into a locking receptacle of the docking station when the cycle is pushed into the docking station by a user.

FIG. 1 illustrates a portion of a cycle management system according to some embodiments. It should be appreciated that FIG. 1 illustrates what may be only one of many docking stations at a cycle rental station. A cycle rental station, for example, may include multiple docking stations and a payment station or terminal, which may be connected as s system via a network. Alternatively or additionally, the cycle rental station may include solar panels, batteries, and/or other components. Solar power may facilitate easy deployment of stations throughout a wide area. Accordingly, the cycle rental station may include a power plant, which may use a solar panel and an energy storage device to provide sufficient solar power such that the cycle rental station may be run without a connection to a power source external to the station. Such a station is shown and described in U.S. Pat. No. 7,898,439, assigned to the present assignee and incorporated by reference in its entirety.

A cycle 6 may include a connecting member 16, which may include a projection 18 for engaging with a cycle docking station 2. The cycle docking station 2 may include a locking receptacle 10 for receiving and locking the connecting member 16 to the cycle docking station 2.

FIGS. 2A-10 illustrate some embodiments of the locking receptacle 10 and the connecting member 16. The connecting member 16 may include an insert end 16A to be inserted into the locking receptacle 10. As illustrated, the connecting member 16 is triangular shaped and the locking receptacle 10 has an opening with sloped walls configured to receive triangular shaped connecting member 16. The sloped walls are designed to guide the connecting member 16 into a predetermined position as it is pushed into locking receptacle 10. The insert end 16A is shown to be rounded, but any suitable shape may be used.

The connecting member 16 may also have an attachment end 16B. The insert end 16A may help guide the connecting member 16 into the locking receptacle 10. Alternatively, the insert end 16A may be cube-shaped, pyramid-shaped, or any other shape.

According to some embodiments, the connecting member 16 may be formed as an integral part of the cycle 6 or formed separately and attached to the cycle 6 via the attachment end 16B. The attachment end 16B may include components for securing the connecting member 16 to the cycle 6 via screws or other attachment means. These components may include a torsion spring hole for a torsion spring (not shown) and/or a connecting member attachment shaft hole for a connecting member attachment shaft (not shown).

Figure 10:
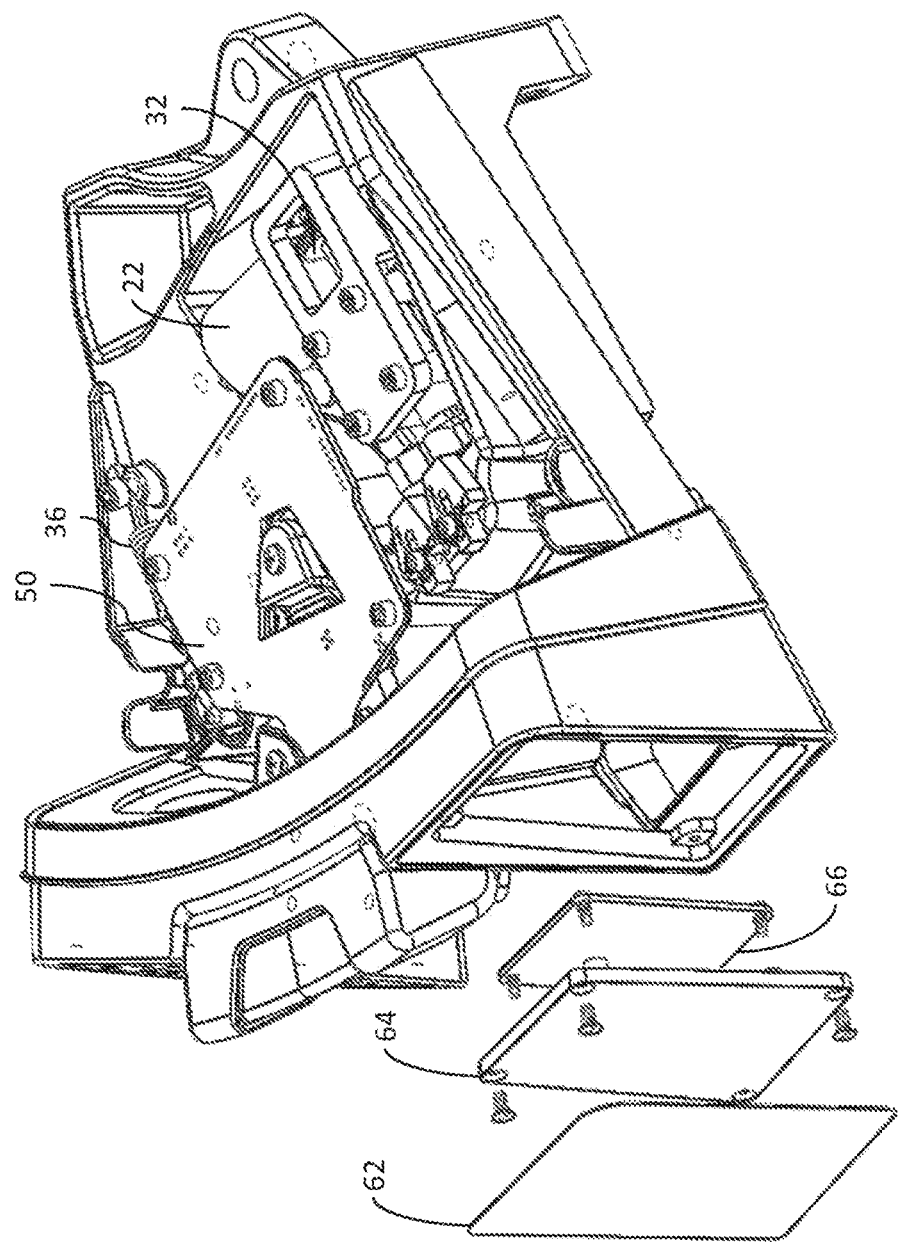
FIG. 10 is a perspective exploded view of a near field communication reader area of the locking receptacle according to some embodiments.
Figure 11A:
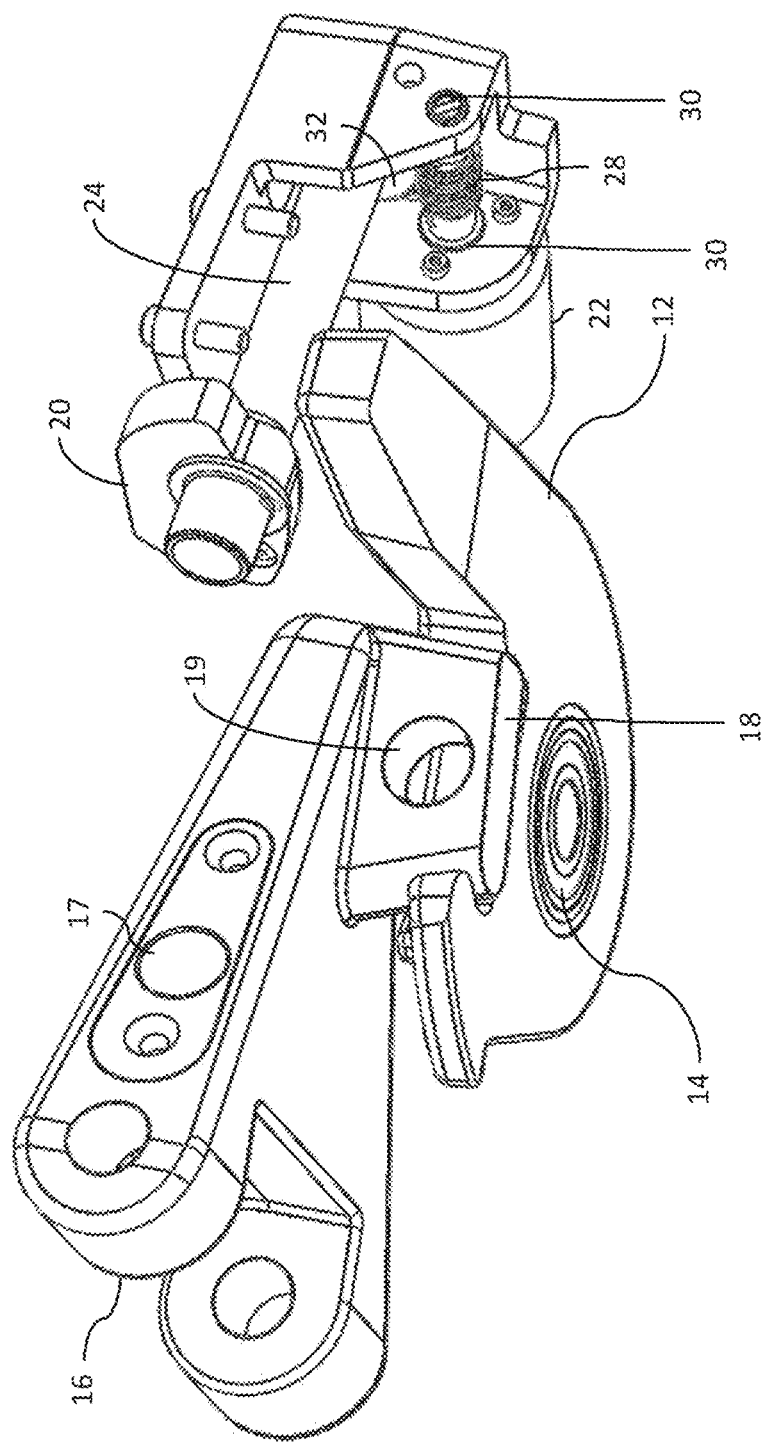
FIG. 11A is a bottom perspective view of the connecting member and the locking member with the locking member in an unlocked position and a movable member in a lockable position according to some embodiments.
Figure 11B:
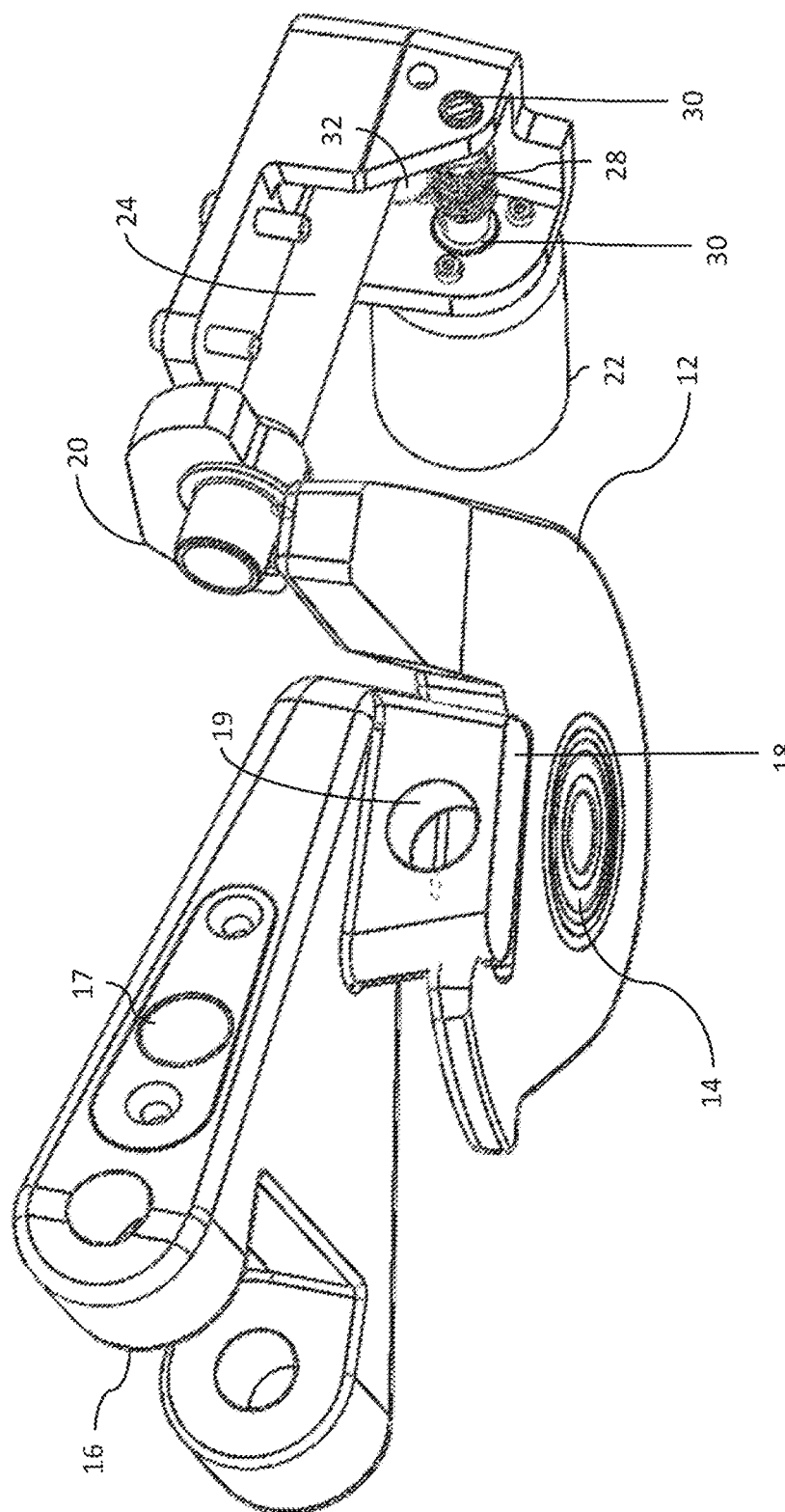
FIG. 11B is a bottom perspective view of the connecting member and the locking member with the locking member in an unlocked position and the movable member in an unlockable position according to some embodiments.
Figure 11C:
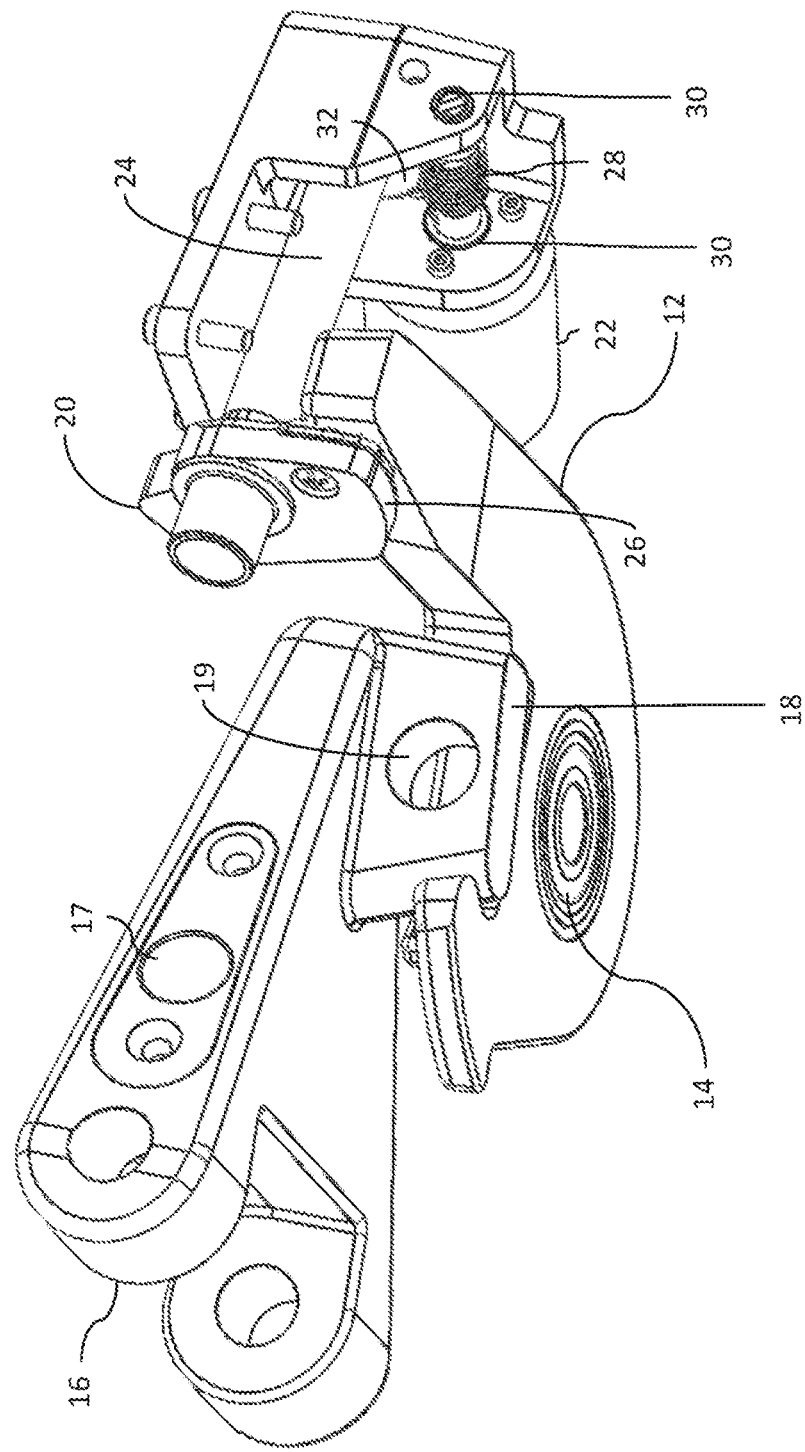
FIG. 11C is a bottom perspective view of the connecting member and the locking member with the locking member in a locked position and the movable member in a lockable position according to some embodiments.
Figure 12A:
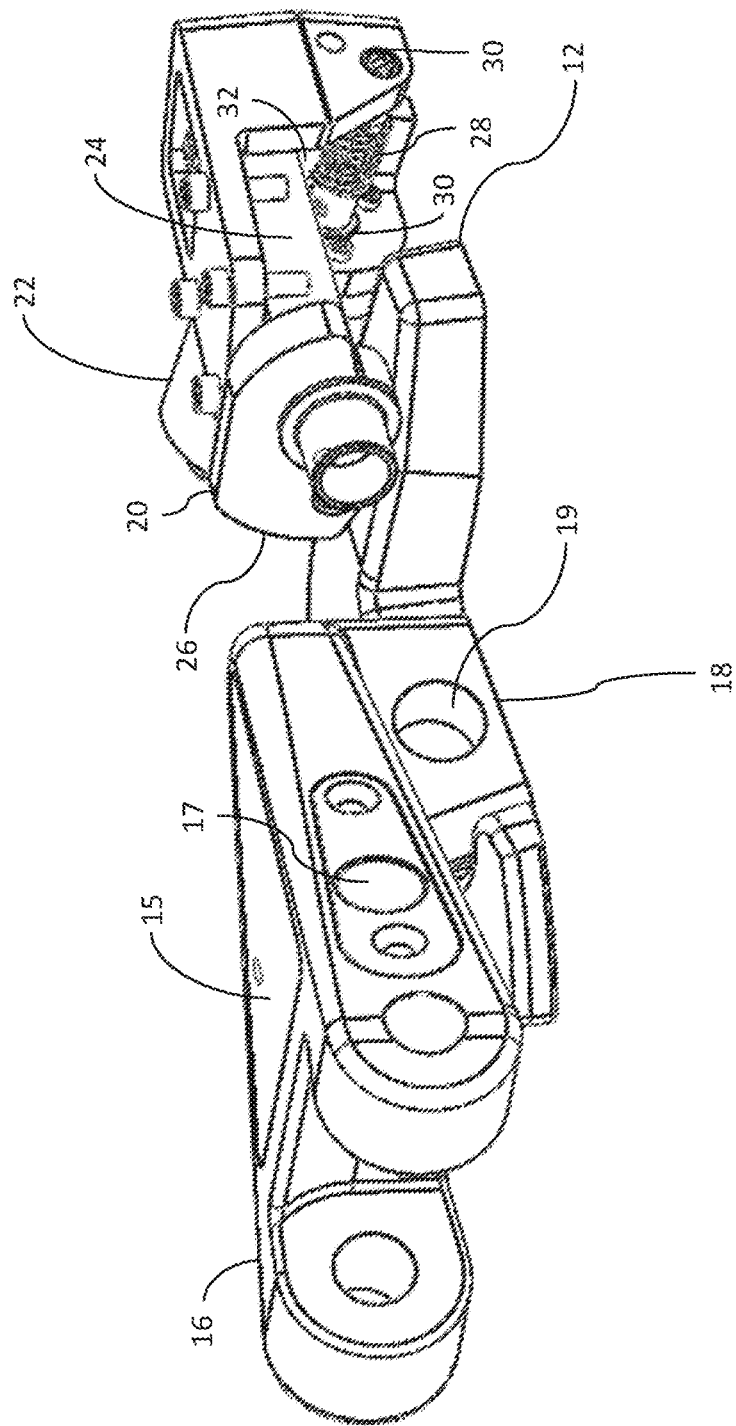
FIG. 12A is a top perspective view of the connecting member and the locking member with the locking member in an unlocked position and a movable member in a lockable position according to some embodiments.
Figure 12B:
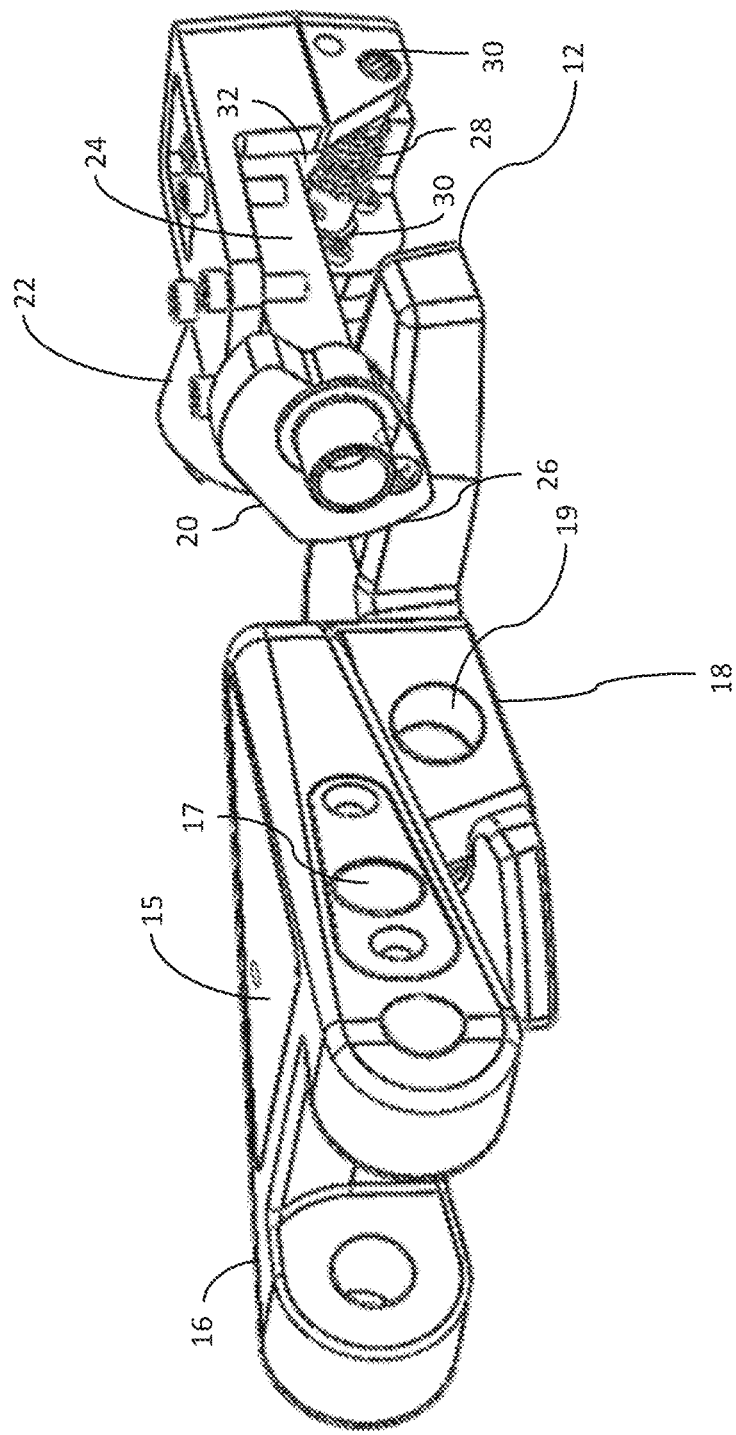
FIG. 12B is a top perspective view of the connecting member and the locking member with the locking member in a nearly locked position and the movable member in a lockable position according to some embodiments.
Figure 12C:
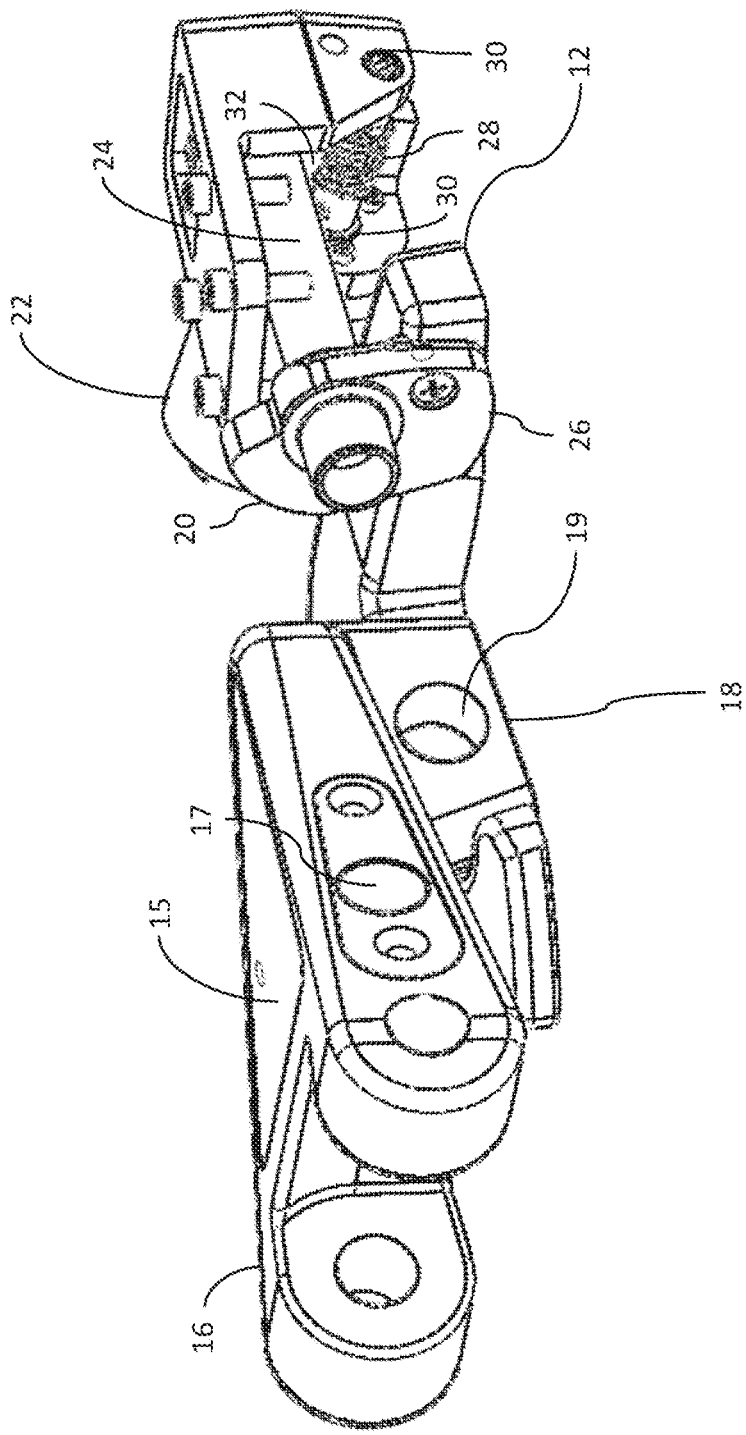
FIG. 12C is a top perspective view of the connecting member and the locking member with the locking member in a locked position and the movable member in a lockable position according to some embodiments.
Figure 13A:
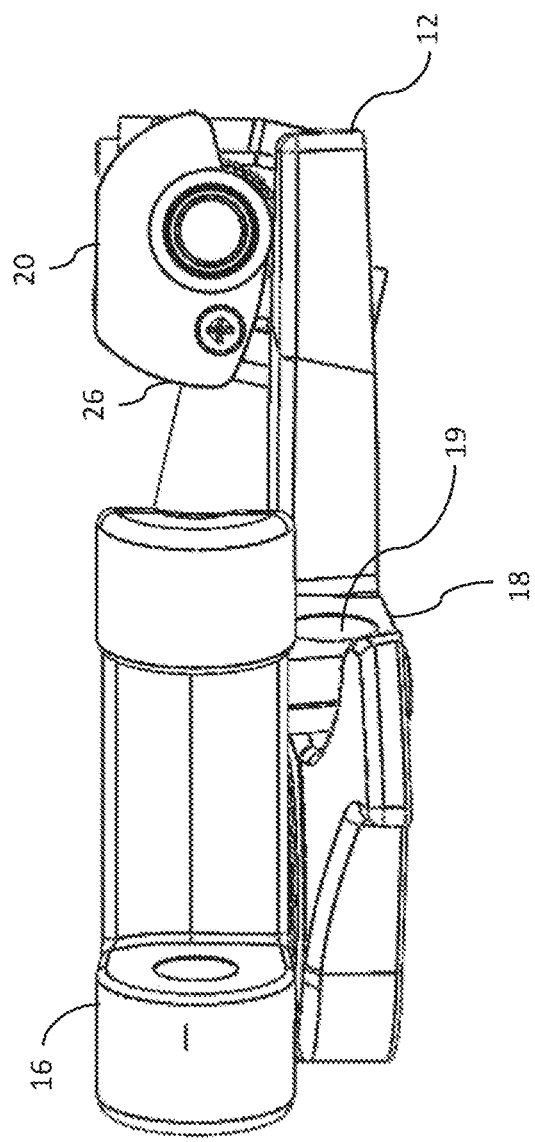
FIG. 13A is a front perspective view of the connecting member and the locking member with the locking member in an unlocked position according to some embodiments.
Figure 13B:
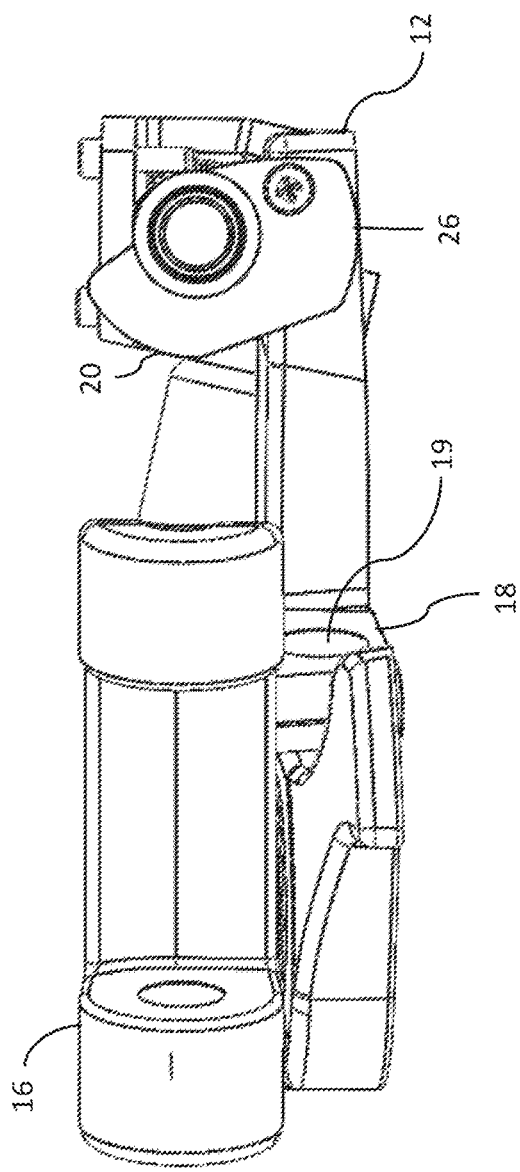
FIG. 13B is a front perspective view of the connecting member and the locking member with the locking member in a locked position according to some embodiments.
Figure 14A:
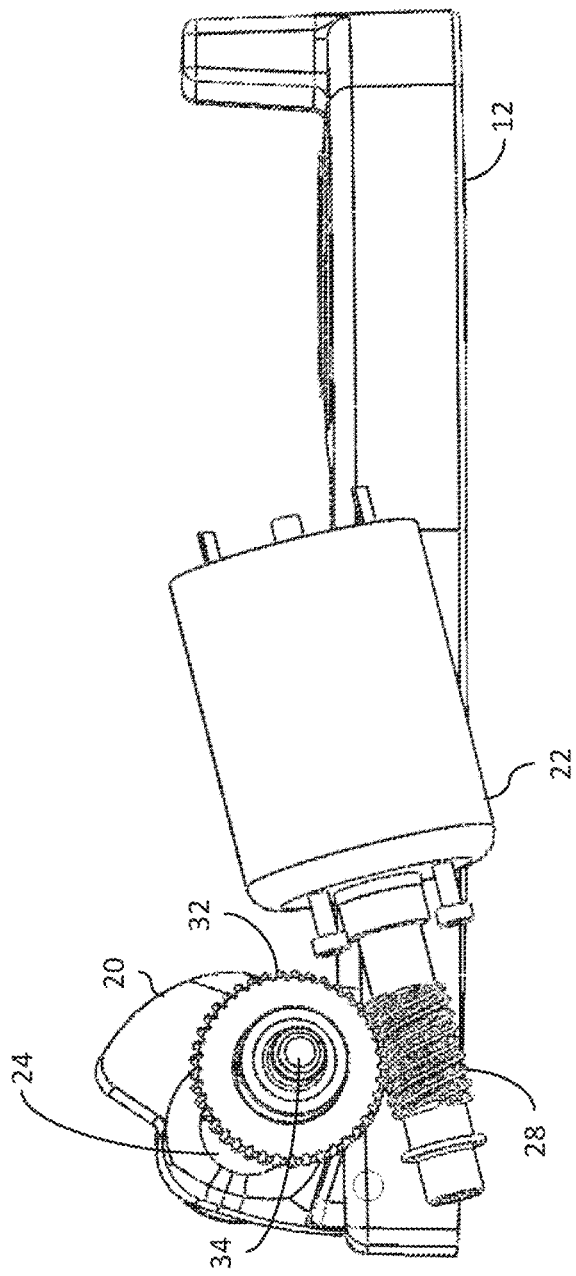
FIG. 14A is a rear perspective view of the locking member and a motor with the locking member in a locked position according to some embodiments.
Figure 14B:
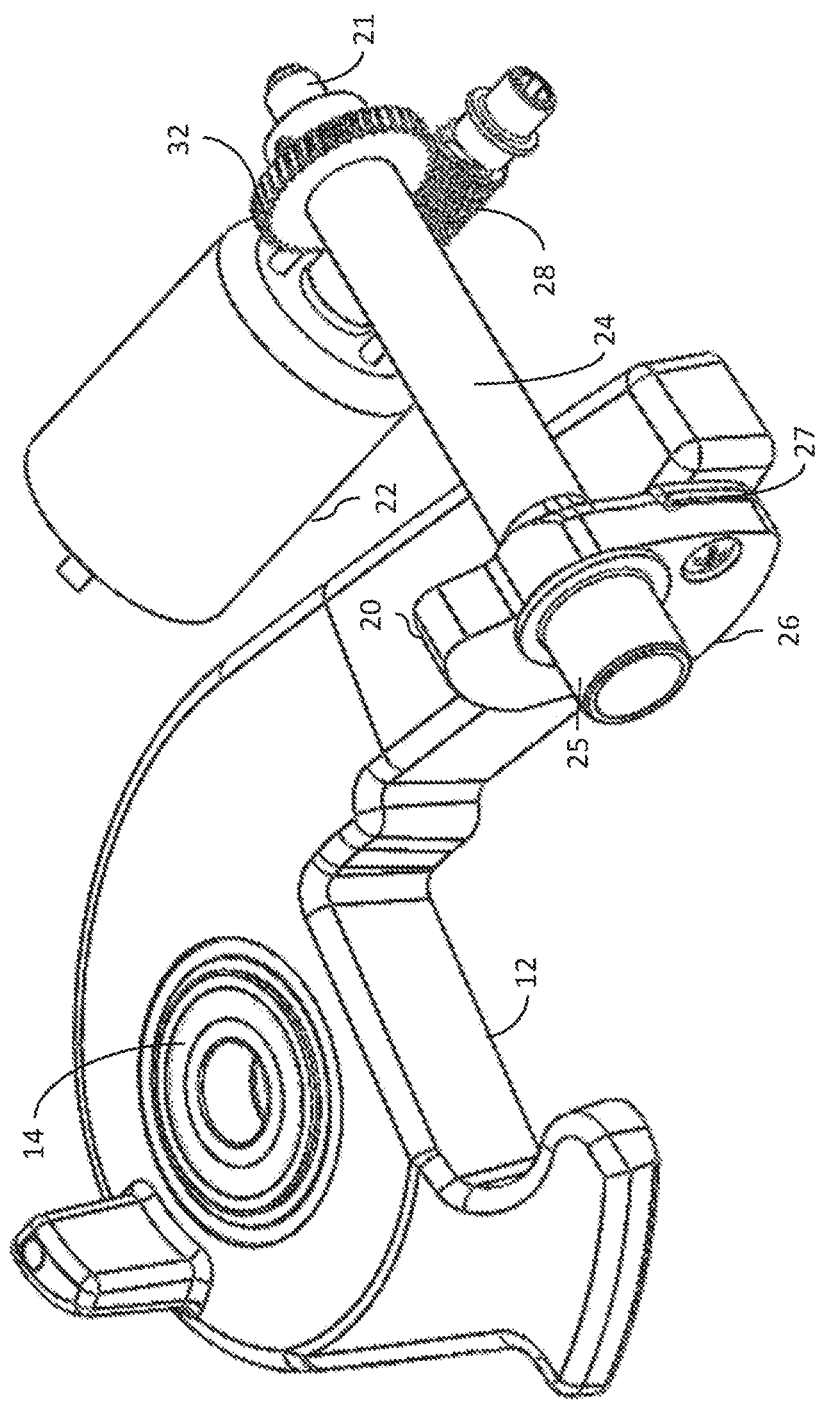
FIG. 14B is a perspective view of the locking member and the motor with the locking member in a locked position according to some embodiments.
Figure 15B:
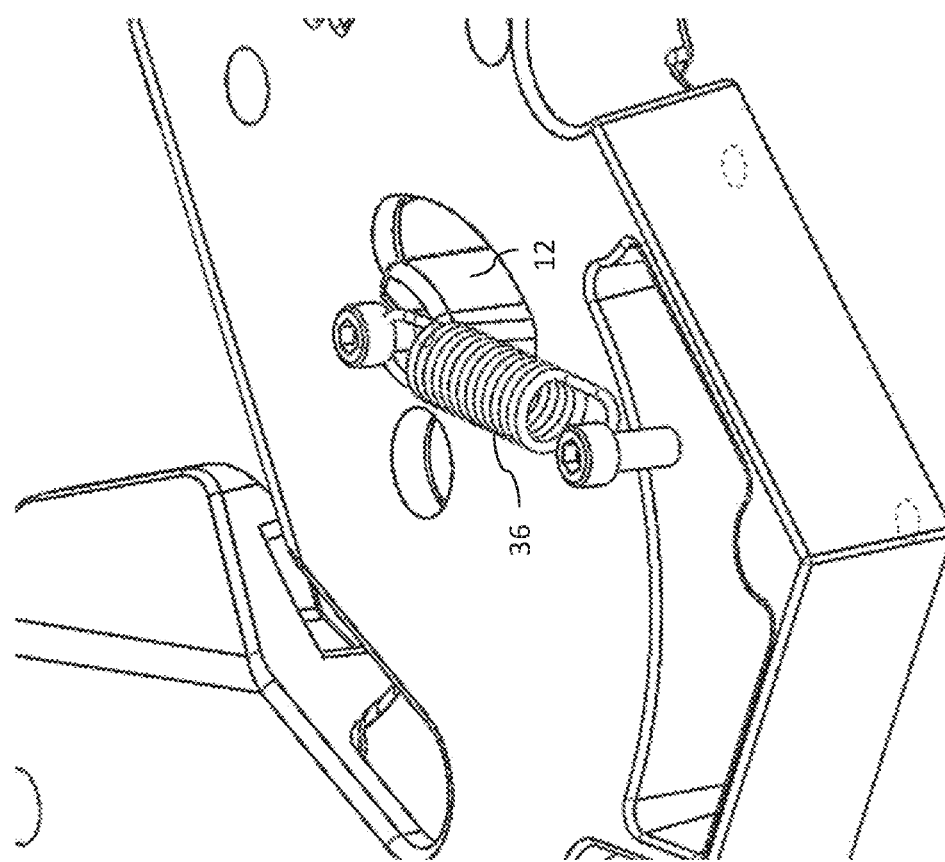
Figure 15C:
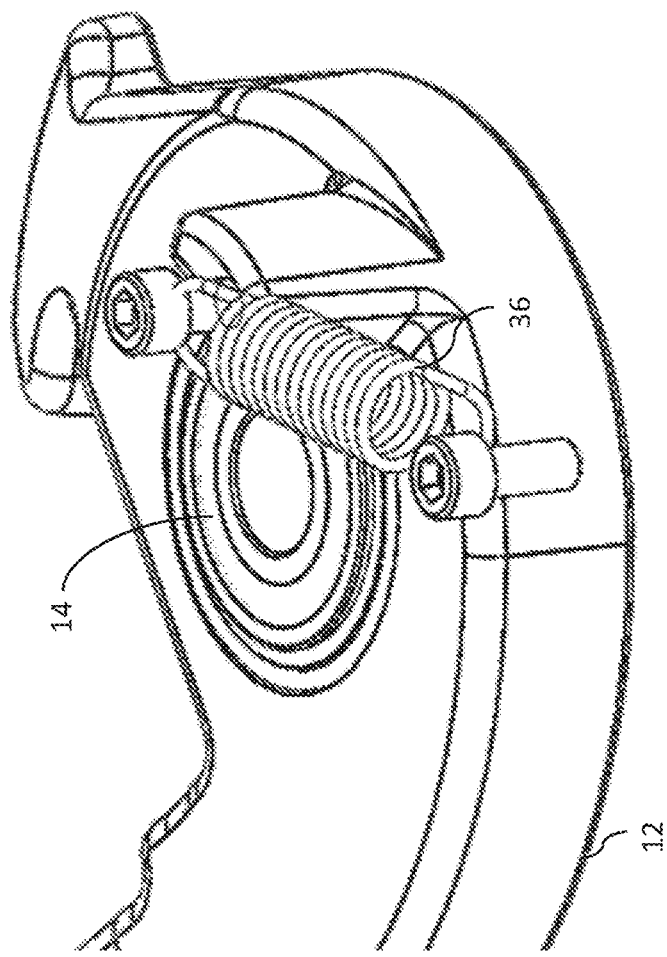
Figure 15D:
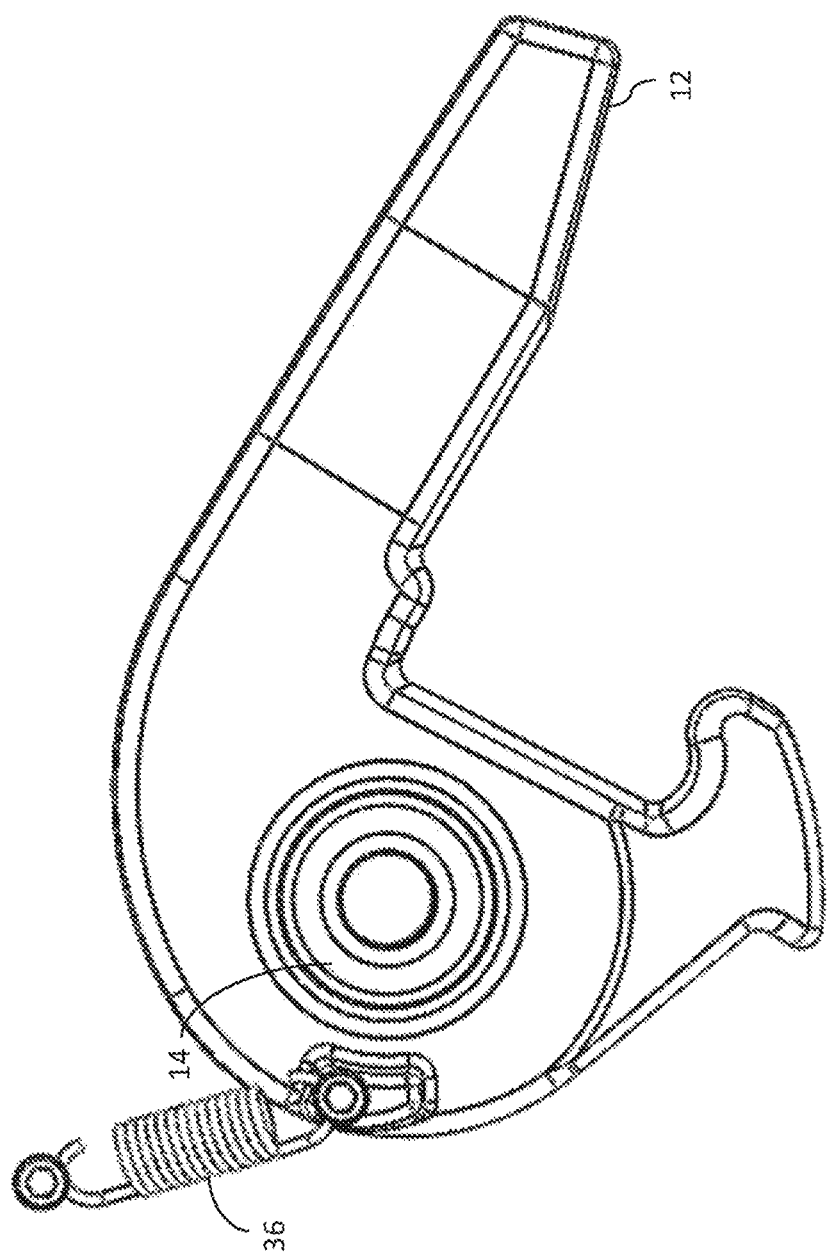
FIG. 15D is a top view of the bias spring and the movable member according to some embodiments.
Figure 16A:
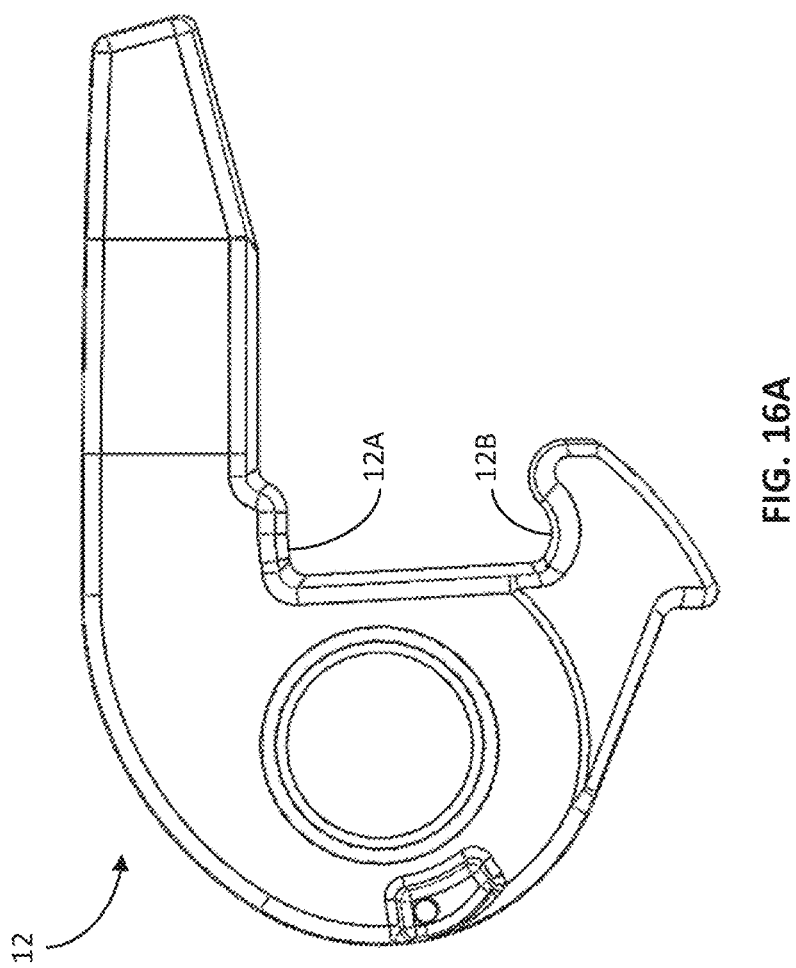
FIG. 16A is a top view of the movable member according to some embodiments.
Figure 16B:
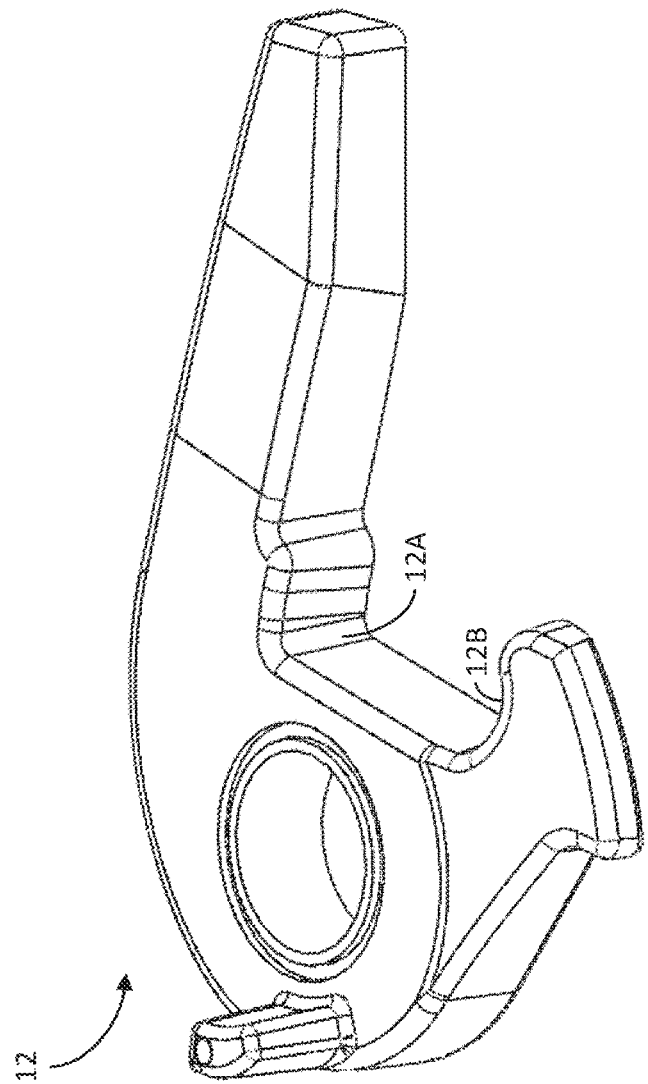
FIG. 16B is a perspective view of the movable member according to some embodiments.
Figure 17A:
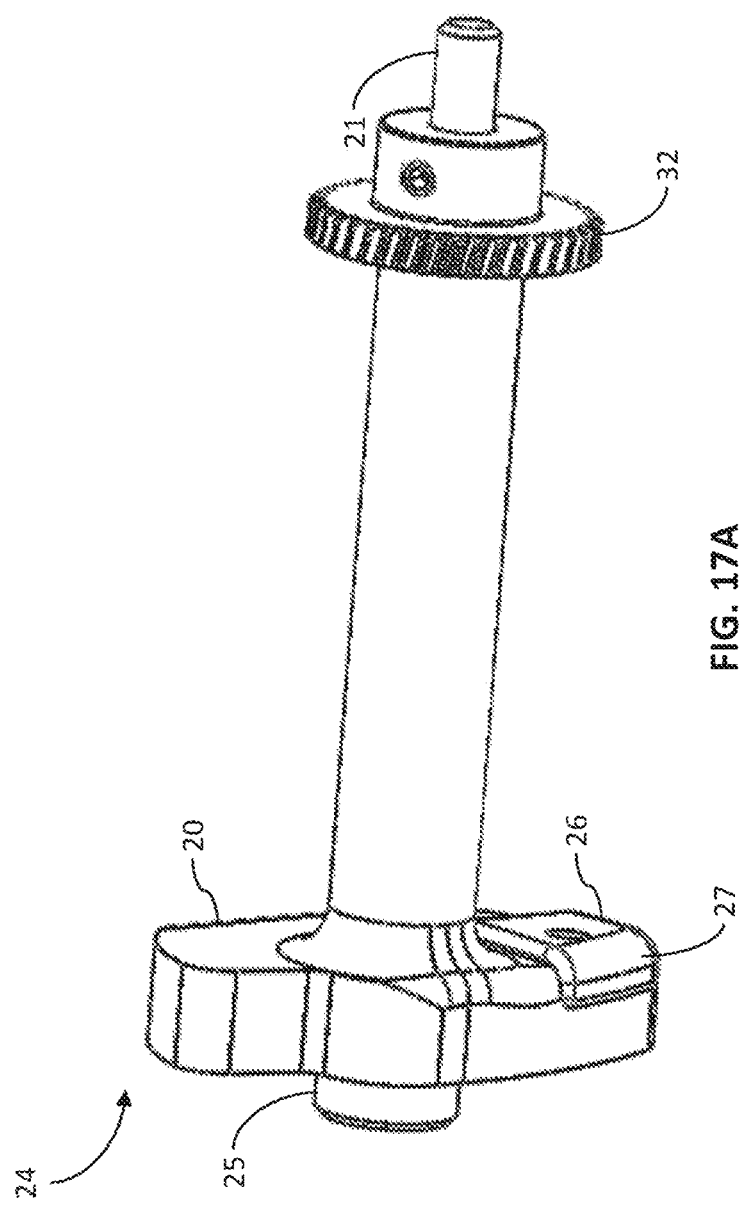
FIGS. 17A and 17B are perspective views of the locking member and a worm gear according to some embodiments.
Figure 17B:
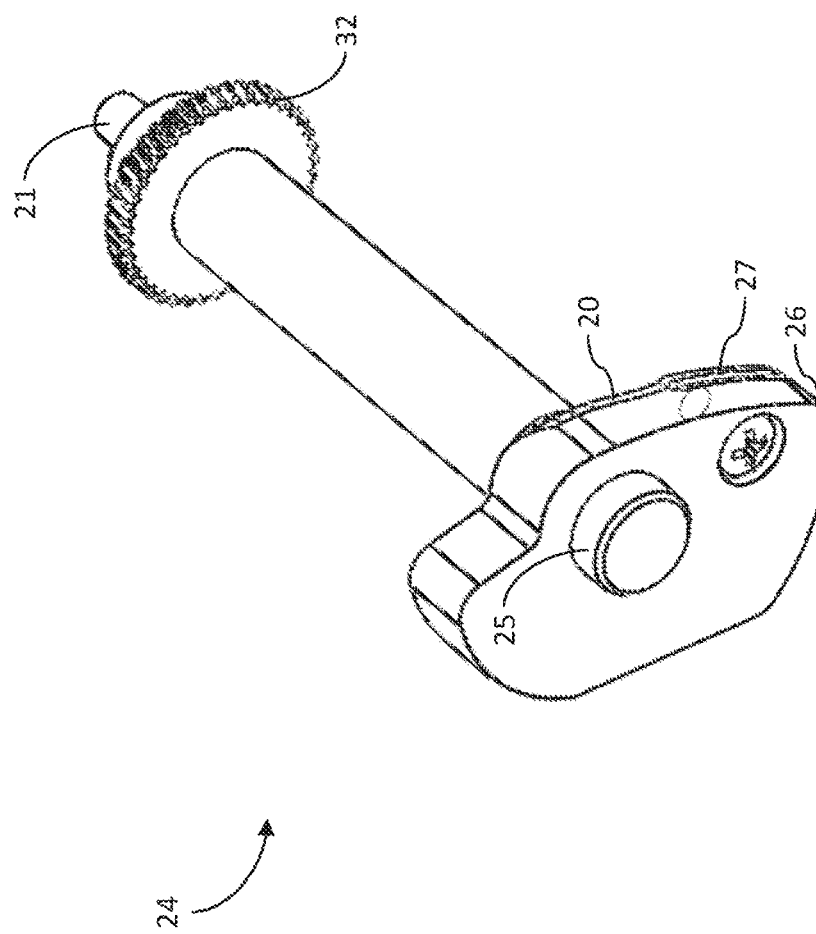
Figure 17C:
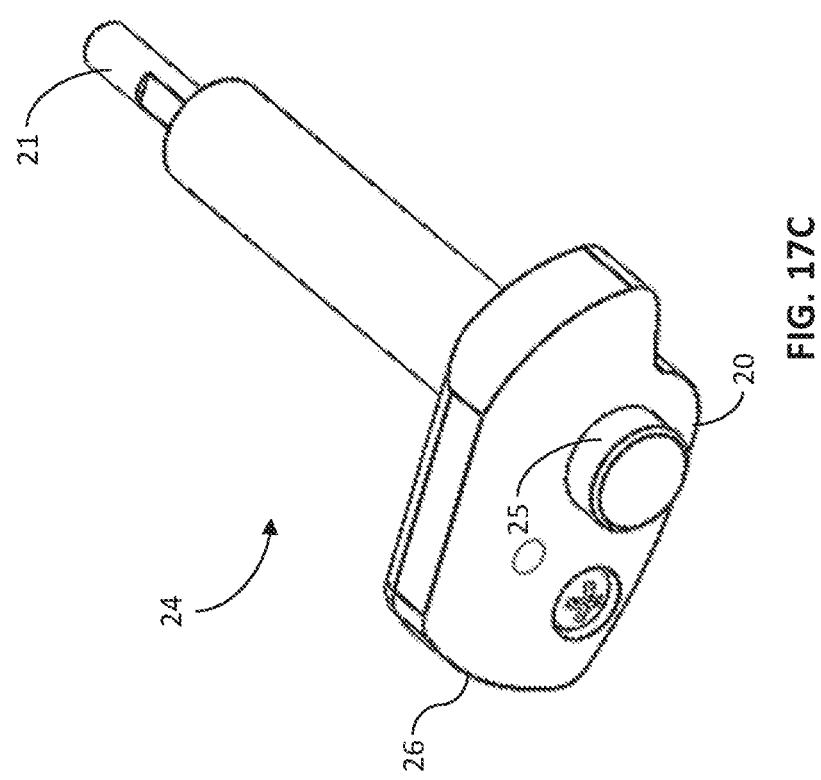
FIGS. 17C and 17D are perspective views of the locking member according to some embodiments.
Figure 17D:
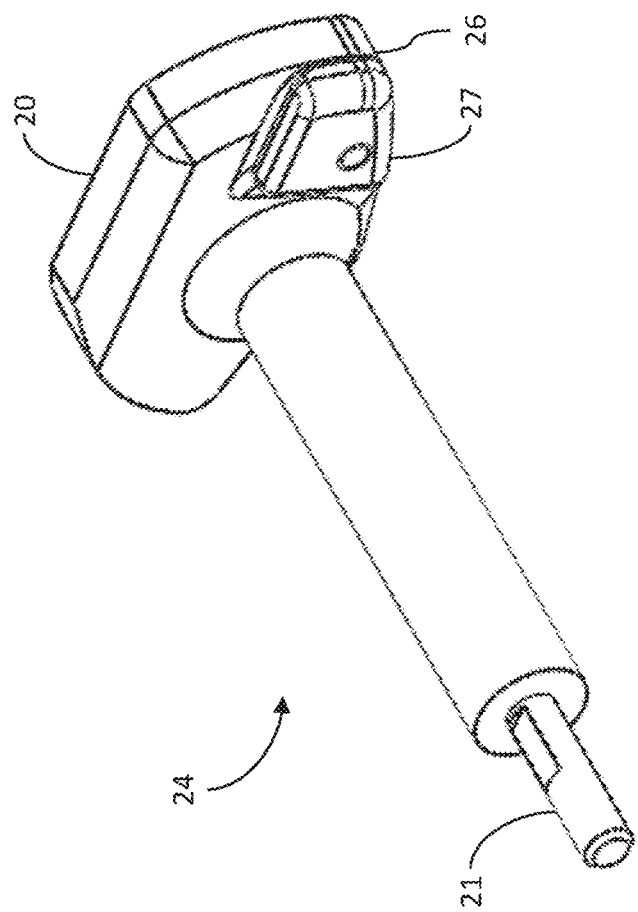

According to some embodiments, the locking receptacle 10 may include a bike/cycle dock controller (BDC) 50 (shown in FIGS. 2A, 6A, 6B, 8A, 8B, and 10) and a near field communication (NFC) antenna 66 (shown in FIG. 10), which may be part of or separate from the BDC 50. The BDC 50 may read from and/or write to an NFC tag placed near the NFC antenna 66. The BDC 50 may identify a user, charge the user's account, and unlock a cycle 6 by reading from and/or writing to the user's NFC tag, which may be embodied in a physical card, emulated on a smart phone, or provided in any other suitable way. The BDC 50 may even read from and/or write to the NFC tag without a user needing to remove the NFC tag from a pocket, bag, or some other enclosure. In some embodiments, the NFC antenna 66 may be covered by a plastic window 64 and a sticker 62 and positioned in an NFC reader area 60, as shown in FIG. 10. In embodiments where the locking receptacle 10 is made of metal or other materials that block or inhibit radio waves, there may be an opening (not shown) centered on the NFC antenna 66. The opening may be filled with plastic or any other material that would allow the NFC antenna 66 to read an NFC tag outside of the locking receptacle 10.

Alternatively or additionally, the locking receptacle 10 may include a radio frequency identification (RFID) antenna that the BDC 50 may use to read a RFID tag in the connecting member 16 to identify the cycle 6 or other movable object that is being returned to the docking station 2. The RFID tag and the RFID antenna may be located anywhere in the connecting member 16 and the locking receptacle 10, respectively, that allows the RFID antenna to read the RFID tag.

In some embodiments, the RFID tag may be located in an RFID tag compartment in the top of the connecting member 16. The RFID tag may be located within an RFID tag enclosure inside the RFID tag compartment. The RFID tag enclosure may be a plastic insert allowing the RFID antenna to read the RFID tag. In embodiments where the locking receptacle 10 is made of metal or other materials that block or inhibit radio waves, there may be an opening (not shown) centered on the RFID antenna. The opening may be filled with plastic or any other material that would allow the RFID antenna to read an RFID tag in the RFID tag compartment of the connecting member 16.

According to some embodiments, the connecting member 16 may include a triangular portion and a projection 18 extending from the triangular portion, as shown in FIGS. 1 and 2B-5B. The projection 18 may include a first edge 18A and a second edge 18B. The second edge 18B may be opposite the first edge 18A of the projection 18. Additionally, the connecting member 16 may include an aperture 19 (shown in FIGS. 7 and 11A-13B), which the locking mechanism may not use in any way to secure the connecting member 16. The aperture 19 may be part of the projection 18, crossing the projection 18 in a direction perpendicular to the direction of motion of the connecting member 16. Additionally, the connecting member 16 may include a ball plunger recess 17 (shown in FIGS. 7 and 11A-12C), which the locking mechanism may not use in any way to align or secure the connecting member 16.

According to some embodiments, the locking receptacle 10 may include a movable member 12. The movable member 12 may include a first edge 12A and a second edge 12B (numbered in FIGS. 16A and 16B). The second edge 12B may be opposite the first edge 12A of the movable member 12. The first edge 12A may be concave, flat, or any other suitable shape.

In some embodiments, the movable member 12 may be movable into at least a first position or a second position. The first position of the movable member 12 may be an unlockable position (shown in FIGS. 2B-4B). The second position of the movable member 12 may be a lockable position (shown in FIGS. 5, 9A, and 9B). In the unlockable position, edge 12B of the movable member 12 may be out of a path of displacement of the connecting member 16 (as shown in FIGS. 2B-3B), allowing the connecting member 16 to move freely out of the locking receptacle 10. However, edge 12A may be in the path when connecting member 16 is pressed into the locking receptacle 10, which may impart motion to the movable member 12. That motion may move movable member 12 into the lockable position.

Figure 4A:
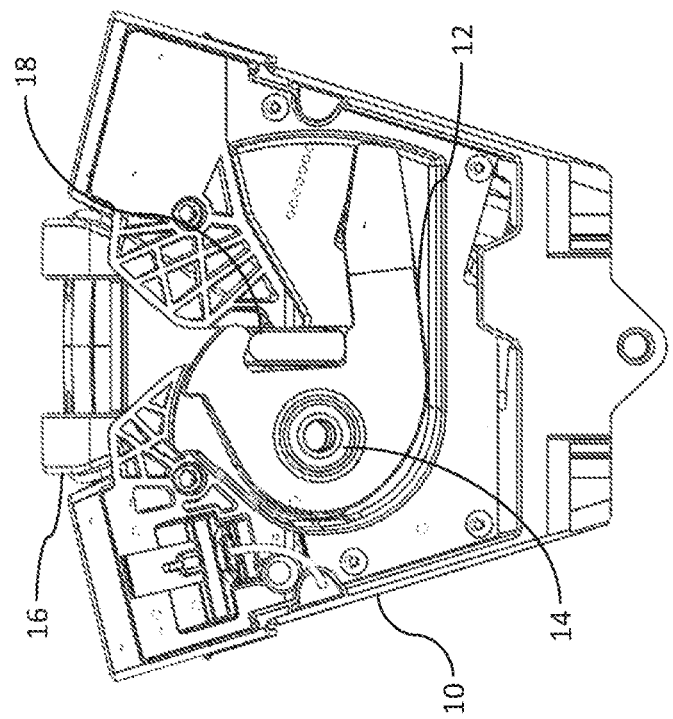
FIGS. 4A and 4B are bottom views of the locking receptacle and connecting member of FIGS. 2A and 2B with the connecting member advanced further to the dockable position than FIGS. 3A and 3B according to some embodiments.
Figure 4B:
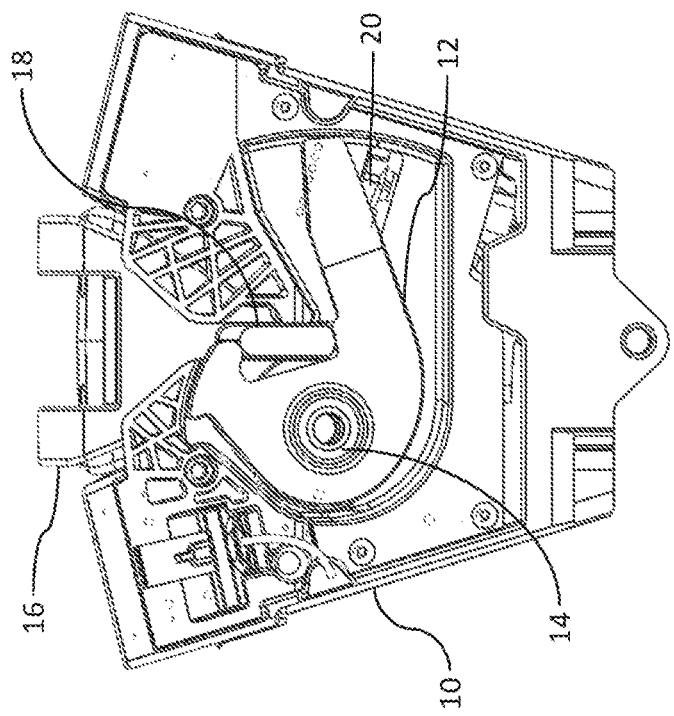

In the lockable position, edge 12B of the movable member 12 may be in the path of displacement of the connecting member 16 (as shown in FIGS. 4A and 4B), preventing the connecting member 16 from moving freely out of the locking receptacle 10. Alternatively or additionally, in the unlockable position, the movable member 12 may not prevent the connecting member 16 from moving freely out of (or in to) the locking receptacle 10, even when the movable member 12 is in the path of displacement of the connecting member 16, if the connecting member 16 pushes against the movable member 12.

Figure 2B:
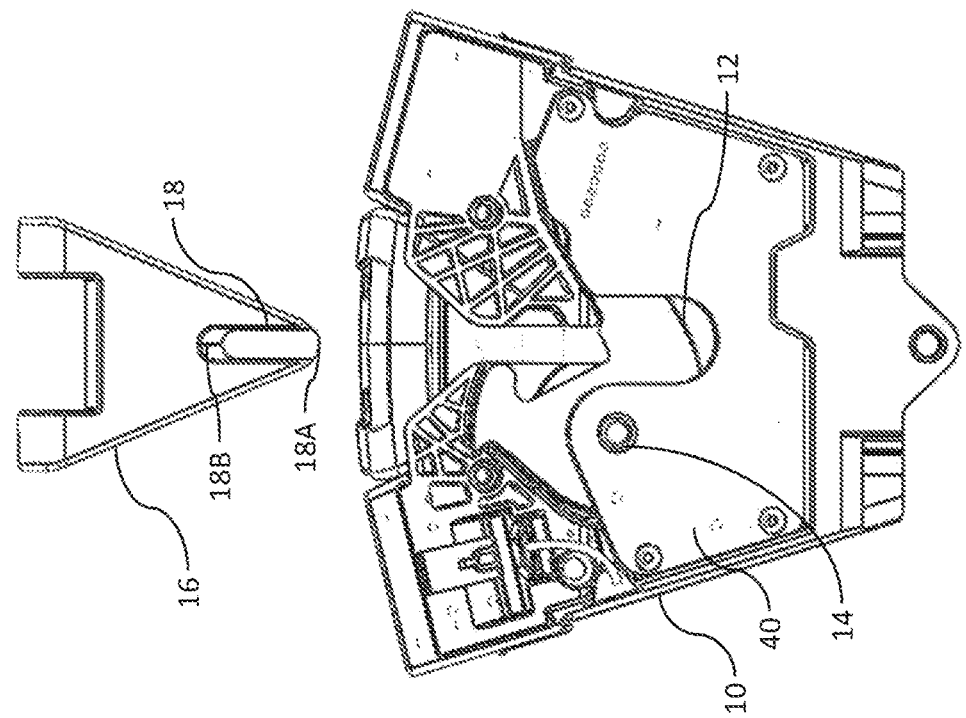
FIGS. 2A and 2B are top and bottom, respectively, views of a locking receptacle and a connecting member in an undocked position according to some embodiments.
Figure 2A:
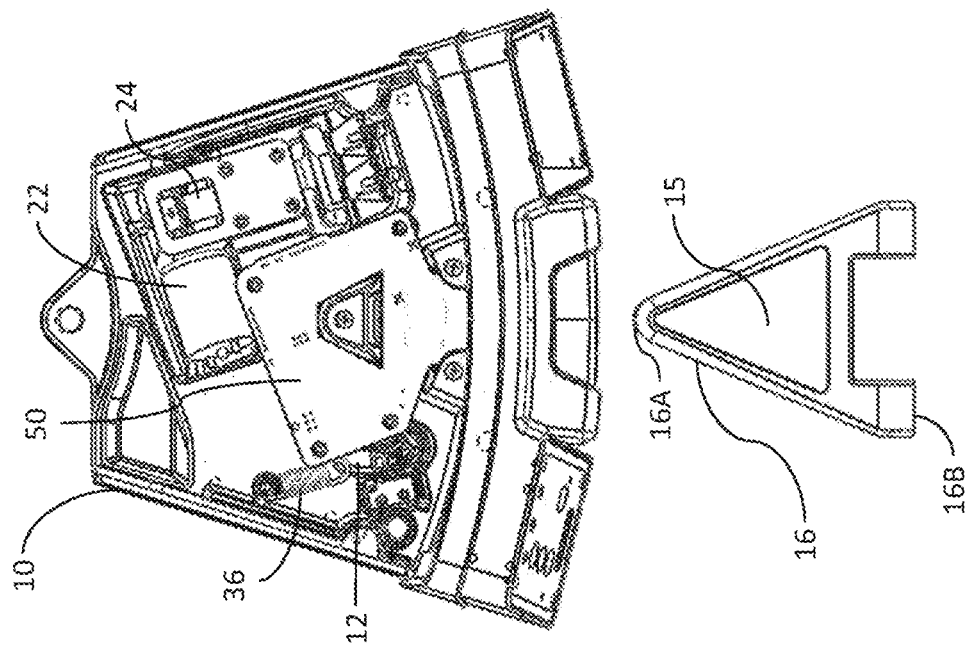

According to some embodiments, a bias spring 36 (shown in FIGS. 2A, 6A, 6B, 10, and 15A-15D) may bias the movable member 12 in the unlockable position. Alternatively, the bias spring 36 may bias the movable member 12 in the lockable position or any other suitable position. Additionally, a shield 40 may be positioned below the movable member 12 (as shown in FIG. 2B) to prevent mechanical interference with motion of the movable member 12, to prevent electromagnetic interference with the BDC 50, or for any other suitable purpose.

According to some embodiments, movement of the movable member 12 may position the second edge 12B of the movable member 12 adjacent the second edge 18B of the projection 18 when the movable member 12 is in the second position. For example, when the movable member 12 rotates to the lockable position while the connecting member 16 is in the locking receptacle 10, the second edge 12B of the movable member 12 may swing around the projection 18 and be next to the second edge 18B of the projection 18 (as shown in at least FIGS. 4B, 5, 9A, and 9B).

Motion of movable member 12 may be caused by force applied by connecting member 16 as it is pressed into locking receptacle 10. Such force may be generated, for example, by a user pushing a cycle 6, to which connecting member 16 is attached, into a docking station 2. In the embodiment illustrated in FIGS. 3B-5, edge 18A presses against movable member 12 in a direction that is off-axis relative to the axis of a pivot point about which movable member 12 rotates. Such an off-axis force causes movable member 12 to rotate. The pivot point may include a pivot pin and a movable member bearing 14. The bias spring 36 may resist this rotation towards the lockable position.

According to some embodiments, the locking receptacle 10 may include a locking member 24. The locking member 24 may include an eccentric portion 20 and a motor 22. The locking member 24 may be shaped to have a locked and unlocked position. In the locked position, locking member 24 may abut movable member 12, preventing movement of movable member 12 in at least one direction. In the unlocked position, locking member 24 may be separated from movable member 12, allowing it to move. For example, locking member 24 may include a lock side and an unlock side. The lock side may include a tab 26 (shown in at least FIGS. 8A and 9B). The lock side and the unlock side may be formed on the eccentric portion 20.

According to some embodiments, the locking member 24 may be in at least a first position or a second position depending on the circumstances. The first position may be an unlocked position and the second positon may be a locked position. Additionally, the locking member 24 may be a cylindrical shaft that can axially rotate between the locked position and the unlocked position. The locking member 24 may be mounted to rotate around any axis that, in the locked position, will position a portion of the locking member 24 in the path of a portion of the movable member 12 as it rotates from the lockable to the unlockable position. That rotation would then remove the locking member 24 from that path when in the unlocked position. In some embodiments, the locking member 24 may rotate about an axis perpendicular to the axis of rotation of the movable member 12. However, it is not a requirement that the locking member 24 be mounted to rotate, as translation or other movements may move portions of a locking member between a locked position in which the path of motion of movable member 12 is blocked and an unlocked position in which the path is unobstructed. For example, the locking member 24 may include a rack and pinion or any other suitable mechanism that can switch between the locked position and unlocked position to either engage or not engage the movable member 12.

According to some embodiments, the unlocked position may be a positon in which the locking member 24 is out of a path of rotation of the movable member 12. For example, in the unlocked position, the lock side including the tab 26 may be out of the path of rotation of the movable member 12, which may allow the movable member 12 to rotate past the eccentric portion 20. In the locked position (in which the locking member 24 may be said to be adjacent the movable member 12), the locking member 24 may secure the movable member 12, such as when the movable member 12 is in the lockable position. For example, the locked position may be a position in which the locking member 24, specifically the lock side, is in the path of rotation of the movable member 12 (or the tab is in the path of rotation), which may secure the movable member 12 and prevent or block it from rotating through the locking member 24. In such a situation, the movable member 12 may secure the connecting member 16 when the movable member 12 is in the lockable position while the locking receptacle 10 is receiving the connecting member 16.

According to some embodiments, the locking system and mechanism may function by inserting the connecting member 16 into the opening of the locking receptacle 10. As the connecting member 16 is moved inside the locking receptacle 10 by a user or any other suitable means, the connecting member 16 may contact and apply force to the movable member 12, driving or pushing the movable member 12. For example, the first edge 18A of the projection 18 may contact and apply force against the first edge 12A of the movable member 12, causing the movable member 12 to displace from the unlockable position to the lockable position. The movable member 12 may displace by translation, rotation, or any other suitable form of displacement.

According to some embodiments, the movable member 12, when in the lockable position, may trigger a cycle present switch (not shown). Triggering the cycle present switch may generate a control signal that can lead to activation of an actuator, causing the locking member 24 to engage the movable member 12 by rotating to the locked position. The cycle present switch may be a mechanical switch that directly triggers the motor 22 that drives the locking member 24, or the cycle present switch may trigger the motor 22 for the locking member 24 indirectly by alerting the BDC 50 to the potential presence of a cycle 6. The BDC 50 may then attempt to verify the presence of the cycle 6, and if the presence is verified, the BDC 50 may trigger the motor 22 to rotate the locking member 24. Alternatively, the cycle present switch may be optical, magnetic, or any other type of switch. For example, the cycle present switch could be a reed switch or a Hall Effect sensor. Alternatively, the locking mechanism may detect that the movable member 12 is in the lockable position in any suitable way.

According to some embodiments, the cycle present switch may be located along the path of rotation of the movable member 12 such that the movable member 12 will trigger the cycle present switch when the movable member 12 is rotated to the lockable position. Alternatively, the cycle present switch 160 may be triggered indirectly by the movable member 12 through one or more objects. In some embodiments, a plunger (not shown) may be positioned along the path of rotation of the movable member 12. When the movable member 12 rotates to the lockable position, the movable member 12 may contact and displace the plunger. The plunger may trigger the cycle present switch when the plunger is displaced a determined distance. The plunger also may include or be connected to a switch trigger (not shown) that triggers the cycle present switch when the plunger is displaced. A spring (not shown) may also be provided. When the movable member 12 is not in the lockable position, the plunger may return to its default (non-triggering) position by the means of the spring. A stopper (not shown) may also be provided to prohibit the plunger from displacing too far. Providing a plunger to indirectly trigger the cycle present switch may protect the switch. For example, if a cycle 6 is inserted at high velocity (e.g., approximately ten miles per hour or greater) or if a foreign object (e.g., hammer, screwdriver, etc.) is inserted into the locking receptacle 10 such as in a theft attempt, the plunger, rather than the cycle present switch, may be subjected to correspondingly strong forces transferred by the movable member 12. Further, the plunger will hit the stopper to inhibit its displacement, preventing undue forces on the cycle present switch.

According to some embodiments, the cycle present switch may be mounted on the BDC 50, which has the advantage of reduced assembly complexity, higher reliability due to less connectors and less cables, and reduced costs. Alternatively, the cycle present switch may be separate from the BDC 50 and connected to the BDC 50 using any suitable mechanism such as wires or connectors.

According to some embodiments, the cycle present switch or an additional cycle present switch may also detect whether the connecting member 16 is in the locking receptacle 10. For example, the cycle present switch may ensure that both the connecting member 16 is in the locking receptacle 10 and the movable member 12 is in the lockable position before triggering the locking member 24 to enter the locked position.

According to some embodiments, the locking receptacle 10 may include position sensors 80 (shown at least in FIG. 6A) to detect the locked and unlocked positions of the locking member 24. The position sensors 80 can determine the position of the locking member 24 (locked or unlocked) based on which sensors are obstructed by the eccentric portion 20 of the locking member 24. The position sensors 80 may be mounted on the BDC 50 or separately connected to the BDC 50.

According to some embodiments, the locking member 24 may prevent the movable member 12 from rotating from the unlockable position to the lockable position by being in the locked position while the movable member is in the unlockable position. For example, the BDC 50 may be programmed to receive a connecting member only after receiving a signal from a terminal (as described below), such as a signal indicating that a cycle 6 needs to be returned to the docking station 2. Alternatively, the locking member 24 may always be in the unlocked position when the movable member 12 is in the unlockable position, allowing the locking receptacle 10 to receive a connecting member 16 at any time.

According to some embodiments, when the connecting member 16 is in the proper locking position, the movable member 12 and the locking member 24 may be triggered (e.g., by actuating of the cycle present switch) to maintain the lockable position and the locked position, respectively. The movable member 12 may maintain the lockable position and the locking member 24 may maintain the locked position until a user completes a rental transaction to rent the cycle 6 or other movable object.

According to some embodiments, the locking member 24 may be positioned in the locking receptacle 10 such that when it is in the unlocked position, the movable member 12 may be freely rotated between the lockable position and the unlockable position. When the locking member 24 is in the locked position, at least a part of the locking member 24 may protrude into the path of rotation of the movable member 12 to engage at least a portion of the movable member 12 to prevent rotation of the movable member 12. The locking member 24 may switch from the locked position to the unlocked position, or vice versa, by any motion (e.g., rotation, pivoting, actuation, articulation, elevation, etc.).

According to some embodiments, the locking member 24 may be positioned within the locking receptacle 10 parallel to the direction of insertion of the connecting member 16 and perpendicular to an aperture 19 of the connecting member 16. Alternatively, the locking member 24 may be positioned within the locking receptacle 10 perpendicular to the direction of insertion of the connecting member 16 and parallel to an aperture 19 of the connecting member 16 or in any other suitable orientation.

In some embodiments, the locking member 24 and movable member 12 may be shaped and positioned such that the locking member 24 may contact the movable member 12 at a first distance from the axis of rotation of the movable member 12, and such that the second edge 18B of the projection 18 may contact the movable member 12 at a second distance to the axis of rotation of the movable member 12. The first distance may be farther from the axis than the second distance. Such a configuration may result in less force transferred to the locking member 24 should someone attempt to remove a cycle 6 forcefully. In some embodiments, the ratio of the first distance to the second distance may be between 3:1 and 7:1. For example, when that ratio is 5:1, a force of 50 pounds on the cycle 6 may result in only 10 pounds at the contact point with the locking member 24.

According to some embodiments, the locking member 24 may be supported on support ends by locking member support bearings 25 on bearing surfaces 21 (shown in FIGS. 14B and 17A-17D). The locking member support bearings 25 may allow axial rotation of the locking member 24 while inhibiting other movement of the locking member 24. The locking member 24 may be positioned to align with the movable member 12 when the movable member 12 is in the lockable position. In the unlocked position, the locking member 24 may be rotated such that the tab 26 is positioned away from the movable member 12, allowing the movable member 12 to be rotated freely. In the locked position, the locking member 24 may be rotated such that the lock side and the tab 26 protrude into the path of rotation of the movable member 12, engaging the movable member 12.

According to some embodiments, the tab 26 may include a plastic insert 27 (shown in FIGS. 14B, 17A, 17B, and 17D) on the surface facing movable member 12. The plastic insert 27 may reduce friction between the locking member 24 and the movable member 12, especially in comparison to the friction between two metal surfaces. The plastic insert 27 may be fastened to the tab 26 using a screw, a bolt, or any other suitable fastener.

Figures 22A, 22B:
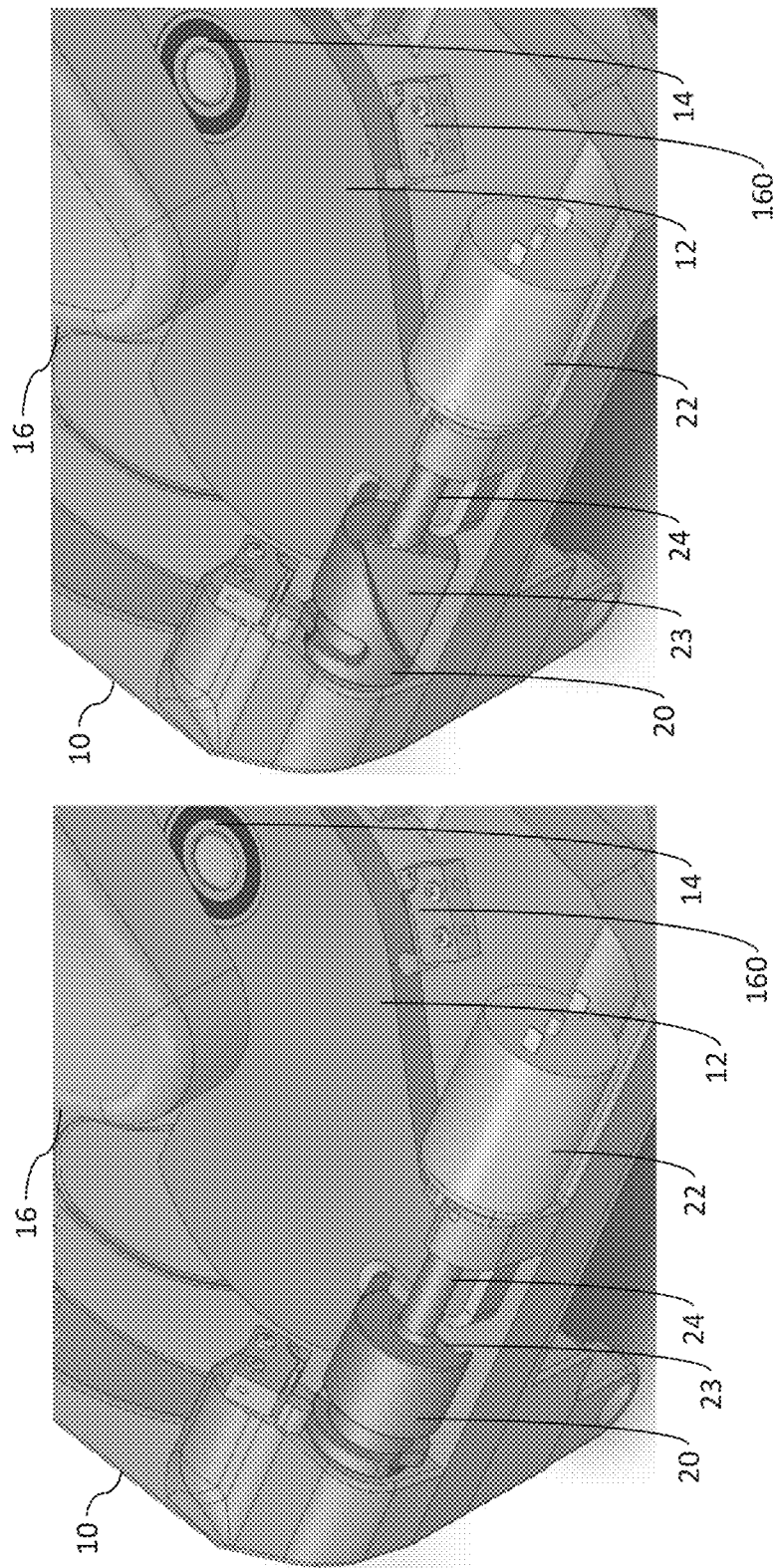
FIGS. 22A and 22B are perspective views of a movable member of the locking receptacle and the connecting member of FIGS. 19A and 19B with the connecting member in the lockable position, but unlocked and locked, respectively, according to alternative embodiments.

According to alternative embodiments (as shown in FIGS. 19A-23), the unlock side of the locking member 24 may include a cutout 23 (shown in FIGS. 22A and 22B). In the unlocked position for the locking member 24, the unlock side including the cutout 23 may be in the path of rotation of the movable member 12, which may allow the movable member 12 to rotate through the cutout 23. In the locked position (in which the locking member 24 may be said to be adjacent the movable member 12), the locking member 24 may secure the movable member 12, such as when the movable member 12 is in the lockable position. For example, the locked position may be a position in which the locking member 24, specifically the lock side, is in the path of rotation of the movable member 12 (or the cutout 23 is out of the path of rotation), which may secure the movable member 12 and prevent or block it from rotating through the locking member 24.

The cutout 23 of the locking member 24 may extend into the eccentric portion 20 to a distance of half of the diameter (or the radius) of the eccentric portion 20 and along a length of the eccentric portion 20. These alternative embodiments provide some advantages. For example, if the cutout 23 extends to about half of the diameter of the eccentric portion 20, a forceful attempt to remove a locked cycle 6 will make the contact point between the movable member 12 and the eccentric portion 20 near the rotation axis of the eccentric portion 20. This makes most of the force linear and directed towards the outside, minimizing rotational force that could reversibly rotate the locking member 24. Minimizing the rotational force is advantageous because it prevents wear and tear on any gear teeth or other vulnerable components the system may have. Additionally, the eccentric portion 20 and/or cutout 23 may have a shape that, as the locking member 24 rotates to the locked position, guides and pushes the movable member 12 into the fully lockable position. This may be advantageous in that a user may not be required to push the connecting member 16 all the way into the locking receptacle 10 so that the movable member 12 enters the fully lockable position, as the locking member 24 may assist.

According to some embodiments, the locking member 24 may be rotated between its locked and unlocked positions using the motor 22 of the locking receptacle 10. A worm drive may also be used with a reduction ratio and geometry chosen to achieve self-locking. A worm 28 may be driven directly from the motor 22 of the locking receptacle 10. The motor 22 may be a simple (rather than "gearhead") direct current (DC) motor with a high rotations per minute (RPM) and may be controlled by the BDC 50. Such a motor 22 provides important advantages. For example, the motor 22 is easier to control than a stepper motor due to simpler electronics. The motor 22 also may have a lower rotor inertia than a conventional motor, and so it can accelerate and decelerate at steeper rates, allowing acceptable locking times. Moreover, the worm 28 may convert the motor's 22 high RPM into higher torque. In addition, the motor 22 does not require much current during normal operation and only requires a higher current if the mechanism is difficult to move (e.g., if the mechanism is stiffened by dirt or wear). On the other hand, a stepper motor tends to require far more current than a simple DC motor, even when less current would have been sufficient to complete movements for locking or unlocking. In solar- and/or battery-powered embodiments, lower current requirements are especially advantageous.

The worm drive also provides advantages. In alternative embodiments, a Geneva drive mechanism may be used to rotate the locking member 24. However, the Geneva drive has a lower reduction ratio than the worm drive. Therefore, the Geneva drive would require additional gearing between the DC motor and the Geneva drive to increase the torque of the locking member 24. Nevertheless, any other suitable irreversible drive may be used in place of the worm drive.

The motor 22, fastened to the locking receptacle 10, may drive the worm 28 supported at both ends by sleeve bearings 30 (shown in FIGS. 11A-12C). The worm 28 matches a worm gear 32 connected to the locking member 24 via a worm gear connector 34 (shown in FIG. 14A). The sleeve bearings 30 may protect the motor 22 from excessive forces (e.g., radial or axial) on the worm 28. For example, when the mechanism is not moving freely (e.g., due to friction or foreign objects inserted near the locking member 24), great axial forces can be generated due to a climbing action of the worm 28 on the worm gear 32.

According to some embodiments, the motor 22, fastened to the locking receptacle 10, drives a motor shaft supported at both ends by radial and thrust bearings (not shown). Alternatively, the radial and thrust bearings may be any other type of bearings. The worm 28 may be mounted on the motor shaft and match the worm gear 32 connected to the locking member 24. The radial and thrust bearings may protect the motor 22 from excessive forces on the motor shaft. For example, as in other situations described, when the mechanism is not moving freely, great axial forces can be generated due to a climbing action of the worm 28 on the worm gear 32.

According to some embodiments, when the motor 22 receives power, the motor 22 rotates. The direction of the motor's 22 rotation depends on polarity. The BDC 50 may control the motor's 22 direction of rotation. The axis of the motor 22 may be coupled to the worm 28 by the means of a set screw (not shown). The worm 28 may include a central worm section machined to match the worm gear 32 and two smaller diameter sections at opposite ends of the worm 28 to engage the sleeve bearings 30. The sleeve bearings 30 may prevent the worm 28 from moving axially and radially, and they may be less expensive and simpler than the radial and thrust bearings. They support the worm 28, which may properly decouple the axis of the motor 22 from the forces subjected to the worm 28 when the motor 22 is operating.

Figure 18:
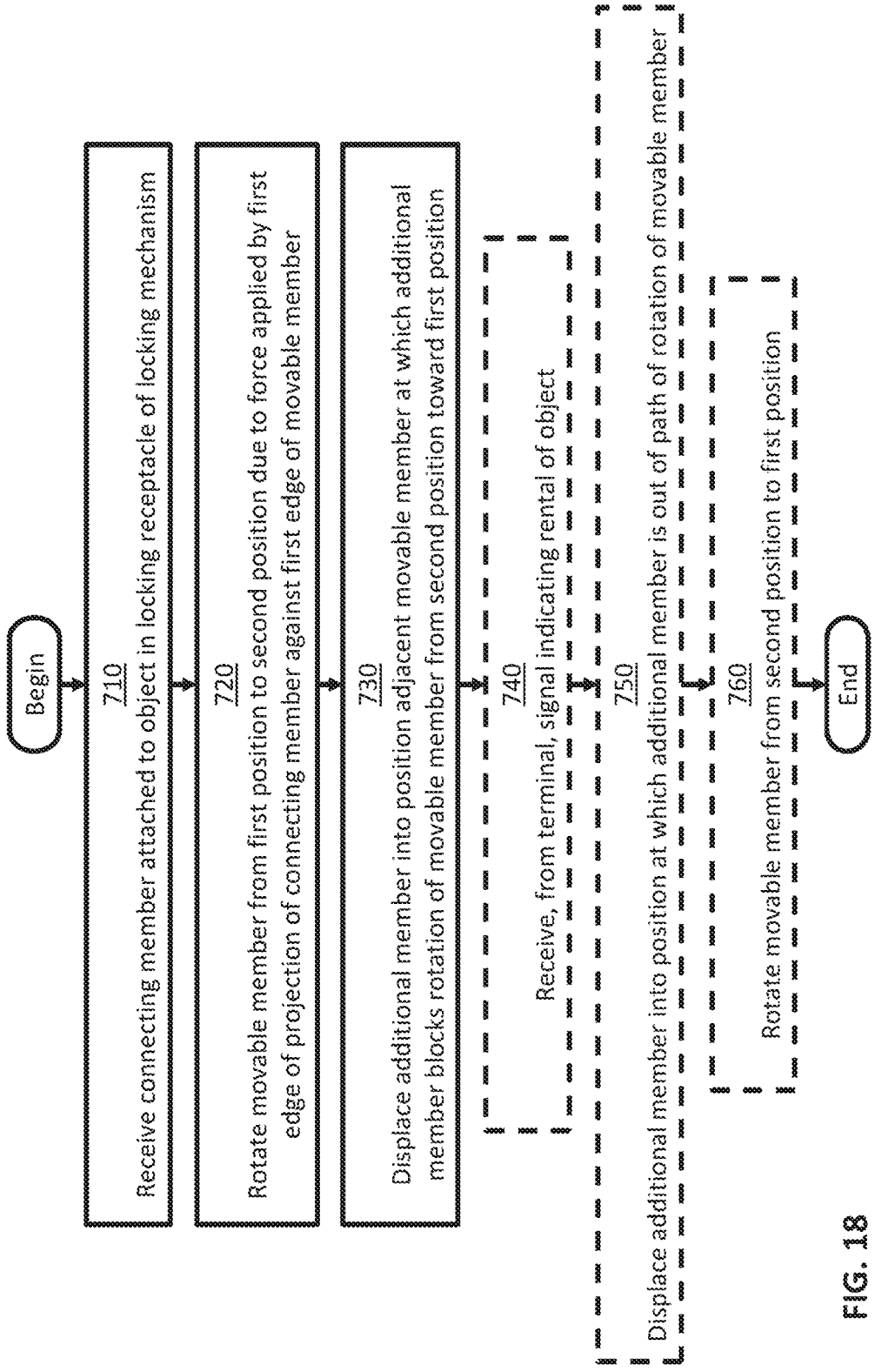
FIG. 18 is a flow chart of a method for operating a locking mechanism on a structure to lock an object according to some embodiments.
Figure 19A:
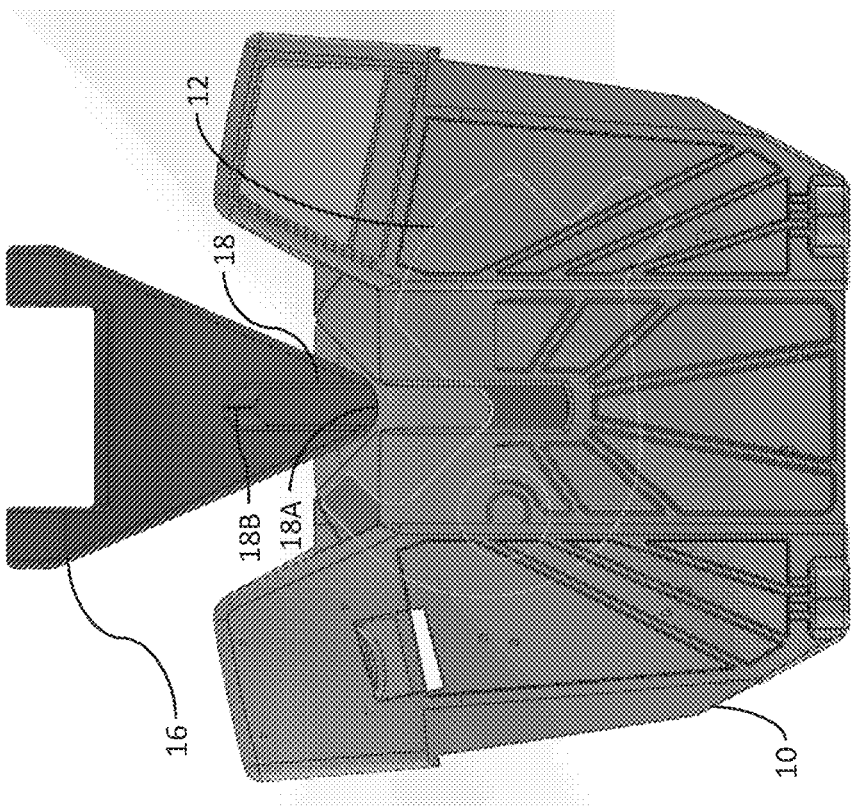
FIGS. 19A and 19B are top and bottom, respectively, views of a locking receptacle and a connecting member in an undocked position according to alternative embodiments.
Figure 19B:
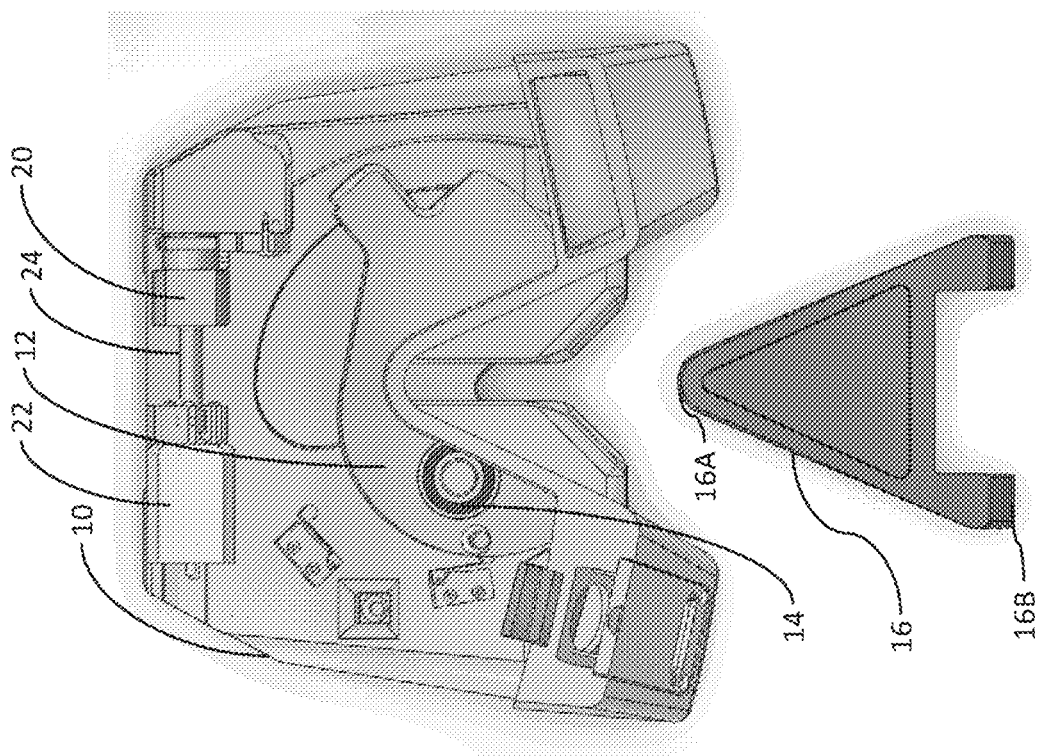
Figure 21A:
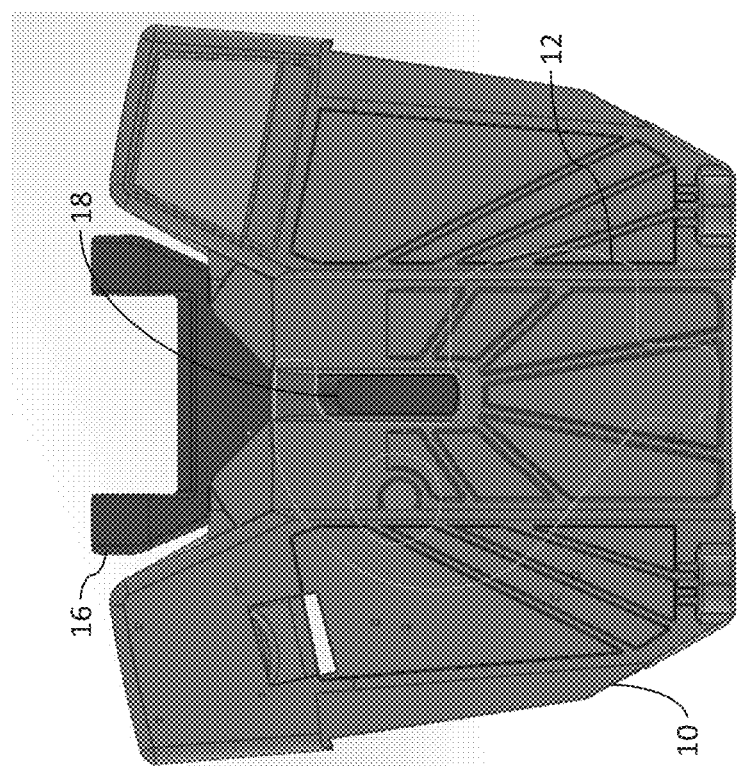
FIGS. 21A and 21B are top and bottom, respectively, views of the locking receptacle and connecting member of FIGS. 19A and 19B with the connecting member advanced to the dockable position according to alternative embodiments.
Figure 21B:
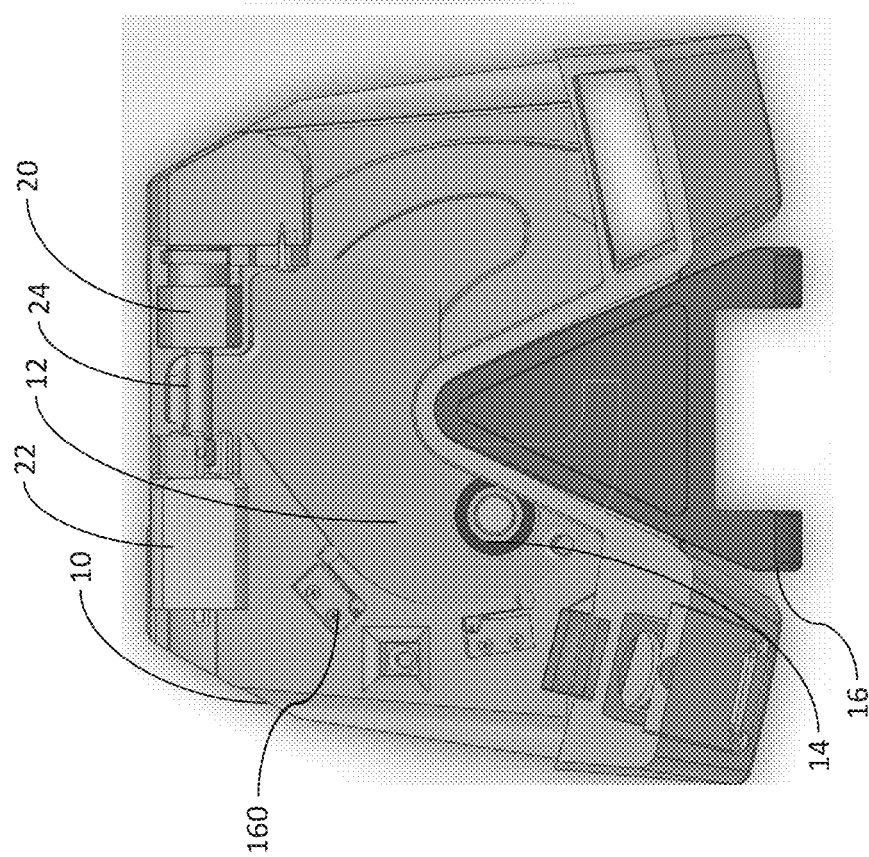

It should be appreciated from the foregoing that some embodiments are directed to a method for operating the locking mechanism, as illustrated in FIG. 18. The method begins at act 710, at which the connecting member 16 attached to the cycle 6 may be received in the locking receptacle 10 of the locking mechanism.

The method then proceeds to act 720, at which the movable member 12 may be rotated from the first position (which may correspond to the unlockable position) to the second position (which may correspond to the lockable position) due to force applied by the first edge 18A of the projection 18 of the connecting member 16 against the first edge 12A of the movable member 12, as described herein.

The method then proceeds to act 730, at which an additional member (which may correspond to the locking member 24) may be displaced into a position adjacent the movable member 12 at which the additional member blocks rotation of the movable member 12 from the second position toward the first position, as described herein.

The method then optionally proceeds to act 740, at which a signal may be received from a terminal (as described below) connected to the docking station 2. The signal may indicate rental of the cycle 6. For example, after a user has successfully completed a rental transaction at a terminal, this signal may be sent by the terminal to the docking station 2.

Optionally, the method then proceeds to act 750, at which the additional member may be displaced into a position at which the additional member is out of the path of rotation of the movable member 12 based on the signal. For example, the additional member may be rotated to the unlocked position so that the movable member 12 can then fully release the cycle 6 to the user.

The method then optionally proceeds to act 760, at which the movable member 12 may be rotated from the second position to the first position based on the signal. For example, after the additional member has rotated to the unlocked position, the movable member 12 may be triggered to rotate to the unlockable position, thus fully releasing the cycle 6 so that the user can remove it from the locking receptacle 10 and the docking station 2. Alternatively or additionally, the movable member 12 may be rotated by a bias spring 36 from the second position to the first position.

The method may then end. However, the method may repeat as many times as suitable so that any number of users may rent and return cycles 6, as described below.

Electronics Platform

The BDC 50 may include a microcontroller, a controller area network (CAN) controller, an NFC reader chip and/or a RFID reader chip, and NFC antenna patterns and/or RFID antenna patterns. The CAN controller may be separate from the microcontroller or built into the microcontroller. Alternatively to the CAN controller, the BDC 50 may include an RS485 bus, with or without additional signals running in parallel to the bus. The BDC 50 may use any suitable communication system or protocol other than CAN or RS485, which may or may not require a controller.

Figure 6A:
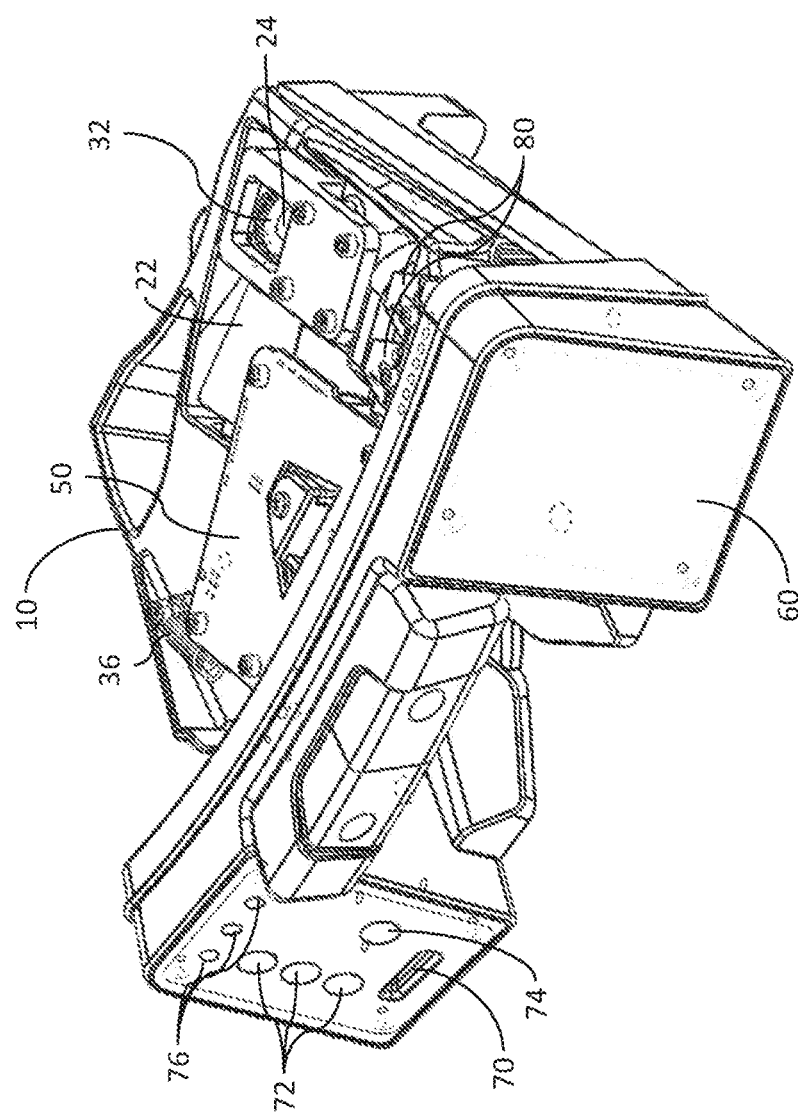
FIG. 6A is a perspective view of the locking receptacle according to some embodiments.
Figure 6B:
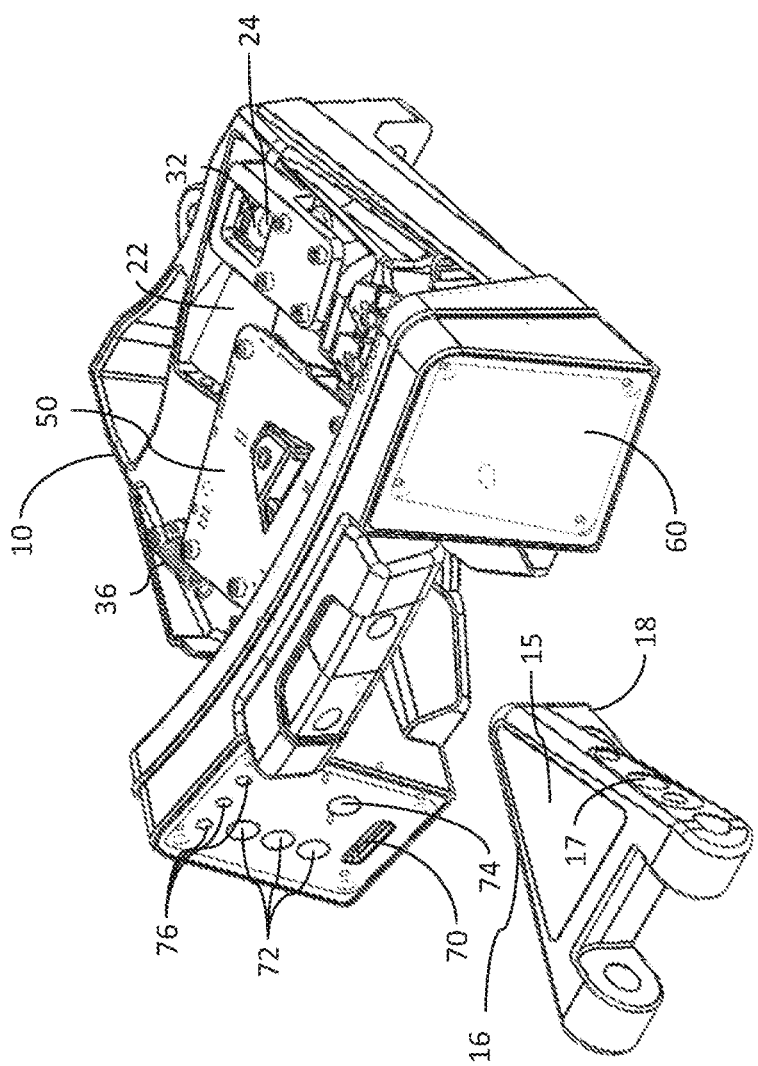
FIG. 6B is a perspective view of the locking receptacle and connecting member of FIGS. 2A and 2B according to some embodiments.
Figure 7:
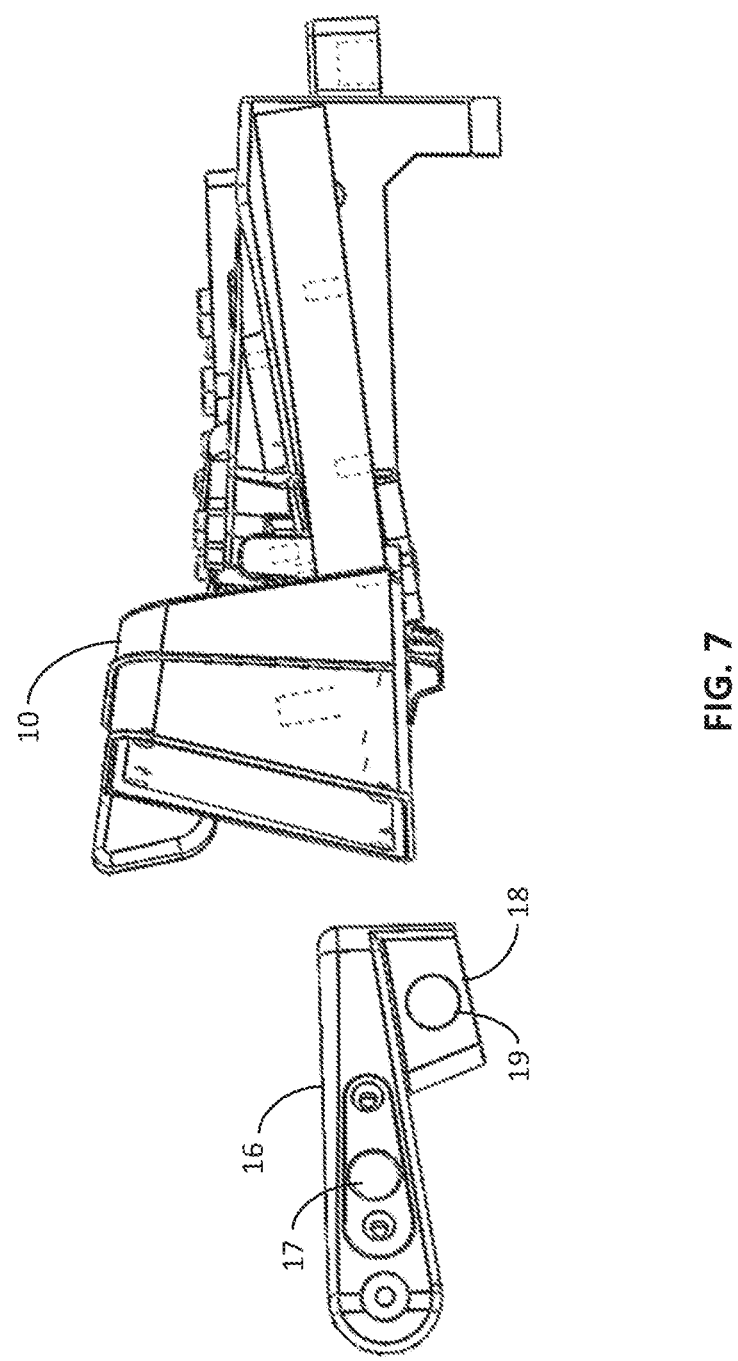
FIG. 7 is a side view of the locking receptacle and connecting member of FIGS. 2A and 2B according to some embodiments.
Figure 8A:
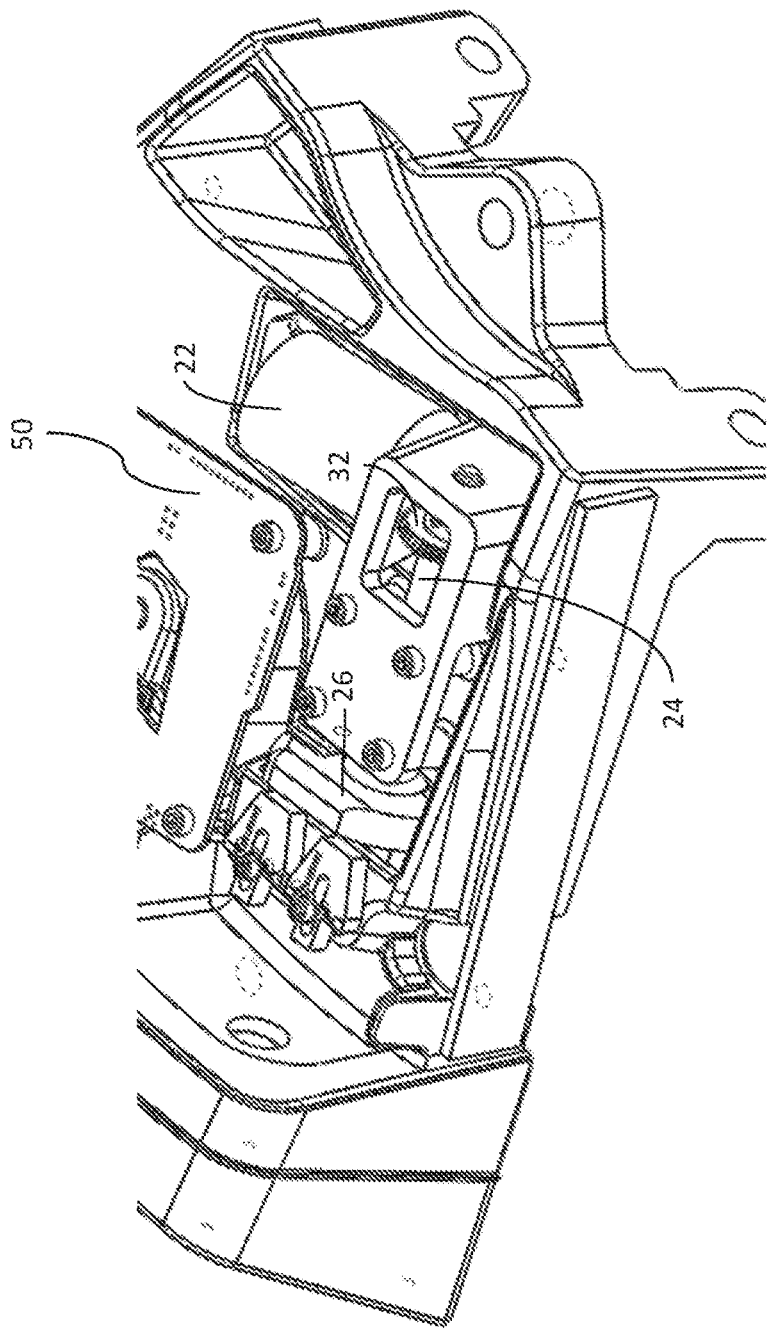
FIGS. 8A and 8B are top perspective views of a portion of the locking receptacle and locking member with the locking member in an unlocked position and a locked position, respectively, according to some embodiments.
Figure 8B:
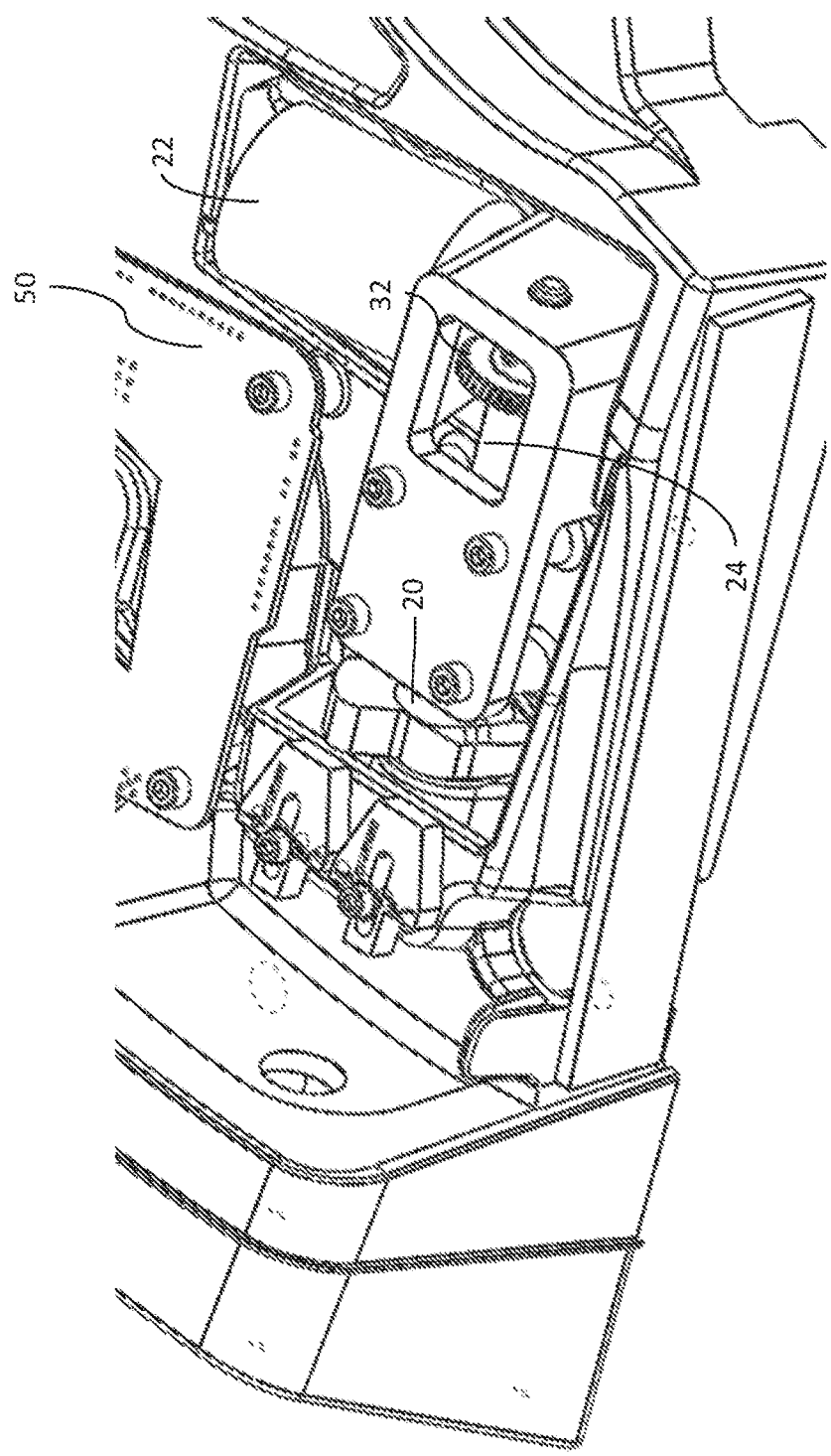

The BDC 50 may be on the same plane as the NFC antenna 66 and/or the RFID antenna. The BDC 50 may also be on the same plane as a cycle key reader, which may be used to read a cycle key (a key that may be used by a user to rent a cycle). The cycle key may alternatively be on a different plane than the BDC 50. The NFC tag and/or the RFID tag may also be on a different plane than the BDC 50. The cycle key reader may be a device separate from the NFC antenna 66, such as a legacy system for users without NFC tags, and/or the NFC antenna 66 may be used as the cycle key reader with NFC tags. FIGS. 6A and 6B illustrate a cycle key reader slot 70 into which a user may insert a cycle key. The cycle key reader may include an antenna board. In some embodiments, the cycle key reader antenna board may be built-in to the BDC 50. Alternatively, any of the BDC 50, the NFC antenna 66, the RFID antenna, the cycle key reader, and the cycle key reader antenna board may be on different planes from each other and may be connected by a single connector or multiple connectors. For example, the BDC 50 may have a connector for connecting the cycle key reader and its antenna board placed at a higher plane in the docking station 2. This is advantageous because the cycle key reader may also have any number of light emitting diodes (LEDs) and the BDC 50 may monitor the states of any number of buttons located near the cycle key reader. For example, FIGS. 6A and 6B illustrate keypad code buttons 72, a cycle defect button 74, and LEDs 76. In some embodiments, the keypad code buttons 72 may be used as an alternative to the cycle key reader and/or the NFC antenna 66. For example, the user may enter a personal identification number using the keypad code buttons 72. Additionally or alternatively, the keypad code buttons 72 may be used to perform maintenance on the locking receptacle 10 or for any other suitable purpose. In some embodiments, the cycle defect button 74 may be used to request a cancellation of a rental transaction if, for example, the user notices a defect with the cycle 6 at some point during the transaction.

Communication Network

In some embodiments, any number of docking stations 2 may be connected to a terminal as part of a communication network based on CAN or any other suitable communication system or protocol. Each docking station 2 may include a BDC 50, which may include a microcontroller, a CAN controller, an NFC reader chip and/or RFID antenna, and NFC antenna patterns and/or RFID antenna patterns as discussed above. As previously discussed, the RFID antenna may read the RFID tag of a connecting member 16 to identify the attached cycle 6 or other movable object. Each docking station 2 may communicate with the terminal through the CAN or some other communication system. The terminal may be able to perform station inventory to check for errors and determine whether each docking station 2 is occupied or available.

The terminal may have its own communication system or protocol, such as CAN, which may be managed through a terminal microcontroller. The terminal microcontroller may be able to store messages received from any docking station 2 through the CAN or other communication system and forward the messages to the terminal's central processing unit (CPU). The CPU may be an ARM CPU or any other kind of suitable CPU. When required, the terminal microcontroller may wake up the CPU from low power sleep mode and wait for the CPU to be ready. The CPU may run software that drives the terminal display screen, processes transactions, communicates with a server through another communication system such as Global System for Mobile Communications (GSM), and manages the connected docking stations 2 (e.g., reports which cycle is docked where and reports errors).

According to some embodiments, the terminal and/or docking stations 2 may be solar and/or battery-powered. It is especially advantageous then to place the microcontrollers and CPUs of the terminal and docking stations 2 into a low power sleep mode as soon as possible in order to save power. On the other hand, when something happens on a docking station 2, such as a cycle 6 being returned, the terminal needs to answer a power request from the docking station 2 as soon as possible so that the system feels as responsive as possible to the users. The time required to wake up the terminal microcontroller is less than the time required to wake up the CPU. Thus it is advantageous to have the terminal microcontroller handle real-time communications occurring via the CAN. Less urgent messages such as "Cycle ID 12345 successfully locked on Docking Station 1" are held in the terminal microcontroller's memory to be sent to the CPU once the CPU is ready to receive them. These messages are then processed by the terminal software which, following validation, will execute any subsequent operations that may be necessary. Alternatively, the CPU may have a CAN controller and may directly handle real-time communications occurring via the CAN.

Exemplary Embodiment: Returning a Cycle

The following is an embodiment of the process for a user to return a cycle 6.

1. The user pushes the cycle 6 into the docking station 2, thereby pushing the movable member 12 from the unlockable position to the lockable position.

2. Step 1 may trigger the cycle present switch, which may wake up the BDC 50 from its low power sleep mode.

3. The BDC 50 may send a power request to the terminal for the anticipated need to lock a cycle 6.

4. The BDC 50 may read the RFID tag using the RFID antenna. If the reading operation fails, the BDC 50 may retry a number of times before aborting, whereupon the BDC 50 may send a power done notification to the terminal and return to low power sleep mode. Following this, the BDC 50 may make no further attempts to read the RFID tag until the cycle present switch is de-triggered and then re-triggered.

5. If the reading operation succeeds, the BDC 50 may wait for the terminal to grant the power request (the BDC 50 may process and transmit the power request during the RFID reads, reducing delays). If the power request times out, the BDC 50 may produce an error feedback to the user before returning to low power sleep mode.

6. If the BDC 50 timely receives the power granted message from the terminal, the BDC 50 may place the locking member 24 into the locked position, locking the movable member 12 and thereby the cycle 6. If the locking operation fails (e.g., jamming occurs), the BDC 50 may return the locking member 24 to the unlocked position and the movable member 12 to the unlockable position and produce an error feedback (e.g., via an error sound and/or a red LED) to the user. The BDC 50 may also send a power done request and an error notification to the terminal before the BDC 50 returns to low power sleep mode. Following this, the BDC 50 may make no further attempts until the cycle present switch is de-triggered and then re-triggered.

7. If the locking operation succeeds, the BDC 50 may send a power done notification to the terminal. The BDC 50 may also send a message indicating that a cycle 6 has been locked. This message may contain at least the cycle identification number read from the cycle's 6 RFID tag.

8. The BDC 50 may return to low power sleep mode.

Exemplary Embodiment: Renting a Cycle

The following is an embodiment of the process for a user to rent a cycle 6.

1. The user may interface a cycle key with a cycle key reader on the docking station 2. As described above, the cycle key may be a NFC tag and the cycle key reader may be the NFC antenna 66.

2. A switch at the bottom of the cycle key reader may wake up the BDC 50 from low power sleep mode when the insertion of a cycle key triggers the switch.

3. The BDC 50 may read the cycle key via the cycle key reader. If the reading operation fails, the BDC 50 may produce an error feedback (e.g., via an error sound and/or a red LED) to the user and return to low power sleep mode.

4. If the reading operation succeeds, the BDC 50 may send an unlock request to the terminal with at least the information from the user's cycle key. The BDC 50 may produce a "please wait" feedback to the user while it waits for the terminal to authorize the request. The BDC 50 may implement a timeout mechanism. If the BDC 50 has not received an unlock granted message from the terminal by the end of a determined timeout period, the BDC 50 may produce an error feedback to the user.

5. If the BDC 50 receives the unlock granted message from the terminal by the end of the determined timeout period, the BDC 50 may send a power request to the terminal.

6. The BDC 50 may wait for the terminal to grant the power request. If the power request times out, the BDC 50 may produce an error feedback to the user before returning to low power sleep mode.

7. If the BDC 50 timely receives the power granted message from the terminal, the BDC 50 may unlock the cycle 6 by rotating the locking member 24 to the unlocked position and rotating the movable member 12 to the unlockable position. If the unlocking operation fails, the BDC 50 may attempt to relock the cycle 6 by rotating the movable member 12 back to the lockable position and rotating the locking member 24 back to the locked position, send a notification about this error to the terminal, produce an error feedback to the user, send a power done message to the terminal, and return to low power sleep mode.

8. Upon successful unlocking, the BDC 50 may produce a success feedback (e.g., "OK" sound and/or a green LED) to the user and send a power done message to the terminal.

9. The BDC 50 may wait for the cycle present switch to become disabled, confirming that the docking station 2 is free of the cycle 6 (which may be based on detection of whether the movable member 12 in the unlockable position, detection of whether a connecting member 16 is in the locking receptacle 10, or both), which is probably in the possession of the user. When the cycle present switch becomes disabled, the BDC 50 may send a notification to the terminal. If the user encounters a defect with the cycle 6, a cycle defect button 74 may be available that the user can press to request a cancellation of the transaction.

10. The BDC 50 may return to low power sleep mode.

In some embodiments, the BDC 50 may omit requesting power from the terminal if the total maximum current for one docking station 2 does not exceed the power carrying capacity of the cables or the power supply capability of the system. It may be advantageous to retain this, however, because it may prevent a large number of users simultaneously returning cycles 6 from causing an overcurrent that blows the system's fuse or fuses. In this regard, a large number may be any number in excess of what the system can support without implementing power requests. This large number may be a function of the total maximum current for one docking station 2, the current carrying capacity of the cables, and the main fuse value. The total maximum current for a docking station 2 may depend on the size of the motor 22, the motor 22 being selected to obtain a good compromise of raw torque and speed. The current carrying capacity of the cables depends on the gauge. As the gauge is lowered, the current capacity increases, but the price also increases. Lower gauge also increases bending difficulty, which does not case installation. The power request feature may lead to cost savings due to less conductive material and easier installation while maintaining reliability.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing," or "involving," and variations thereof herein, is meant to encompass the items listed thereafter and equivalents thereof as well as additional items.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A locking mechanism for locking a connecting member secured to a movable object, comprising:
    a locking receptacle having an opening with sloped walls leading into a slot configured to receive and guide the connecting member into a predetermined position as the connecting member is pushed into the locking receptacle along a direction of docking of the movable object;
    a movable member positioned in the locking receptacle and configured to rotate to secure the connecting member in response to the connecting member being received by the locking receptacle; and
    a locking member configured to switch between a locked position and an unlocked position, the locking member comprising a lock side and an unlock side, the unlock side formed on an eccentric portion of the locking member and comprising a cutout,
    wherein, corresponding to the unlocked position of the locking member, the cutout of the unlock side of the locking member is disposed such that a first portion of the movable member is permitted to rotate through the cutout past the eccentric portion, and
    wherein the cutout is configured such that moving the locking member from the unlocked position to the locked position urges the movable member into a lockable position.

2. The locking mechanism of claim 1, wherein the cutout reduces a cross-sectional area of the eccentric portion and extends along an axis of rotation of the locking member.

3. The locking mechanism of claim 1, wherein the lock side of the locking member comprises a tab, and wherein, corresponding to the locked position of the locking member, the tab of the lock side of the locking member is configured to engage the movable member to prevent a rotation of the movable member.

4. The locking mechanism of claim 3, wherein the tab is configured to be out of a path of rotation of the movable member when the locking member is in the unlocked position.

5. The locking mechanism of claim 1, the connecting member comprising a first portion coupled to the movable object and a projection extending from the first portion, wherein a first extent of a cross-section of the projection oriented along the direction of docking of the movable object is longer than a second extent of the cross-section oriented perpendicular to the direction of docking, the cross-section disposed in a horizontal or transverse plane of the projection.

6. The locking mechanism of claim 5, the projection comprising a first edge and a second edge opposite the first edge, the first edge oriented toward the opening of the locking receptacle as the connecting member is pushed into the locking receptacle.

7. The locking mechanism of claim 6, the movable member comprising an axis of rotation, a first length, and a second length, wherein the first length of the movable member is defined between the axis of rotation and a location of contact of the movable member with the locking member, and wherein the second length of the movable member is defined between the axis of rotation and a location of contact of the movable member with the second edge of the projection, and wherein the first length is greater than the second length.

8. The locking mechanism of claim 7, wherein the movable member is configured to rotate about the axis of rotation of the movable member from an unlockable position to a lockable position to secure the connecting member in response to the connecting member being received by the locking receptacle.

9. The locking mechanism of claim 8, wherein the movable member is configured to be out of a path of displacement of the connecting member when the movable member is in the unlockable position, and wherein the movable member is configured to be in the path of displacement of the connecting member when the movable member is in the lockable position.

10. The locking mechanism of claim 8, wherein the locking member is configured to rotate about an axis perpendicular to the axis of rotation of the movable member to switch between the locked position and the unlocked position, the locking member configured to secure the movable member while the movable member is in the lockable position and while the locking member is in the locked position.

11. The locking mechanism of claim 7, wherein the movable member comprises a hub section, a first arm, and a second arm, the first arm and the second arm extending from the hub section and disposed in a plane perpendicular to the axis of rotation of the movable member, the hub section configured to pivot about the axis of rotation, the first arm configured to operatively engage with the projection of the connecting member, and the second arm configured to operatively engage with the locking member.

12. The locking mechanism of claim 11, wherein the second arm comprises a base portion proximal to the hub section, and wherein the first arm and the base portion of the second arm of the movable member form a pocket configured to receive the projection of the connecting member.

13. The locking mechanism of claim 1, the connecting member comprising a plurality of sloped walls, wherein the sloped walls of the locking receptacle are configured to guide and engage the plurality of sloped walls of the connecting member.

14. The locking mechanism of claim 1, wherein the locking member comprises a cylindrical shaft configured to axially rotate to switch between the locked position and the unlocked position.

15. The locking mechanism of claim 1, wherein the locking receptacle, the movable member, and the locking member comprise a portion of a docking station configured to receive the connecting member.

16. A method comprising:
  receiving a connecting member of a movable object at a locking receptacle, the locking receptacle having an opening with sloped walls leading into a slot configured to receive and guide the connecting member into a predetermined position as the connecting member is pushed into the locking receptacle along a direction of docking of the movable object;
  rotating, based on receiving the connecting member, a movable member positioned in the locking receptacle to secure the connecting member;
  rotating a locking member to a locked position to secure the movable member by the locking member, the locking member comprising a lock side configured to engage the movable member to prevent a rotation of the movable member corresponding to the locked position; and
  rotating the locking member to an unlocked position to permit the movable member to move out of a path of displacement of the connecting member, the locking member comprising an unlock side formed on an eccentric portion of the locking member and comprising a cutout, a first portion of the movable member permitted to rotate through the cutout past the eccentric portion corresponding to the unlocked position, the cutout configured such that moving the locking member from the unlocked position to the locked position urges the movable member into a lockable position.

17. The method of claim 16, further comprising:
  rotating the movable member to an unlockable position to permit the movable object to be withdrawn from the opening of the locking receptacle.

18. A system comprising:
  a plurality of docking stations; and
  a terminal connected to the plurality of docking stations by a network, wherein at least one of the docking stations comprises:
    a locking receptacle having an opening with sloped walls leading into a slot configured to receive and guide a connecting member secured to a movable object into a predetermined position as the connecting member is pushed into the locking receptacle along a direction of docking of the movable object;
    a movable member positioned in the locking receptacle and configured to rotate to secure the connecting member in response to the connecting member being received by the locking receptacle; and
    a locking member configured to switch between a locked position and an unlocked position, the locking member comprising a lock side and an unlock side, the unlock side formed on an eccentric portion of the locking member and comprising a cutout,
  wherein, corresponding to the unlocked position of the locking member, the cutout of the unlock side of the locking member is disposed such that a first portion of the movable member is permitted to rotate through the cutout past the eccentric portion, and wherein the cutout is configured such that moving the locking member from the unlocked position to the locked position urges the movable member into a lockable position.

19. The system of claim 18, wherein the cutout reduces a cross-sectional area of the eccentric portion and extends along an axis of rotation of the locking member.

20. The system of claim 18, the connecting member comprising a first portion coupled to the movable object and a projection extending from the first portion, wherein a first extent of a cross-section of the projection oriented along the direction of docking of the movable object is longer than a second extent of the cross-section oriented perpendicular to the direction of docking, the cross-section disposed in a horizontal or transverse plane of the projection.

* * * * *